United States Patent
Nakagome

(10) Patent No.: US 9,961,321 B2
(45) Date of Patent: May 1, 2018

(54) IMAGE PROCESSING DEVICE AND IMAGE PROCESSING METHOD HAVING FUNCTION FOR RECONSTRUCTING MULTI-ASPECT IMAGES, AND RECORDING MEDIUM

(71) Applicant: CASIO COMPUTER CO., LTD., Shibuya-ku, Tokyo (JP)

(72) Inventor: Kouichi Nakagome, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 644 days.

(21) Appl. No.: 13/903,829

(22) Filed: May 28, 2013

(65) Prior Publication Data

US 2014/0002618 A1 Jan. 2, 2014

(30) Foreign Application Priority Data

Jun. 28, 2012 (JP) .................................. 2012-145849

(51) Int. Cl.
*H04N 13/00* (2018.01)
*H04N 5/232* (2006.01)

(52) U.S. Cl.
CPC ..... *H04N 13/0007* (2013.01); *H04N 5/23212* (2013.01)

(58) Field of Classification Search
CPC ....................... H04N 13/0007; H04N 5/23212
USPC .......................................................... 348/50
See application file for complete search history.

(56) References Cited

U.S. PATENT DOCUMENTS

| 6,901,161 B1 * | 5/2005 | Wakashiro ............ G06T 7/0018 348/50 |
| 7,936,392 B2 | 5/2011 | Ng et al. |
| 8,358,367 B2 | 1/2013 | Ng et al. |
| 8,395,696 B2 | 3/2013 | Ng et al. |
| 2011/0129165 A1 * | 6/2011 | Lim .................... H04N 5/23212 382/255 |
| 2011/0285871 A1 * | 11/2011 | Sakai ...................... G06T 5/008 348/229.1 |
| 2012/0002076 A1 * | 1/2012 | Takahashi .......... H04N 5/23232 348/231.2 |
| 2012/0044400 A1 * | 2/2012 | Okada ................ H04N 5/23212 348/333.01 |

(Continued)

FOREIGN PATENT DOCUMENTS

JP 2008-515110 A 5/2008

*Primary Examiner* — On S Mung
(74) *Attorney, Agent, or Firm* — Holtz, Holtz & Volek PC

(57) ABSTRACT

A video is generated from multi-aspect images. For each frame of the output video, a provisional video is created with provisional images which are used to designate a position of a target object on which to focus and to acquire a depth map showing a depth of the object, and which are reconstructed using default values from LFIs as the frames. Then, information designating coordinates of focal positions of the target object on the provisional video is acquired. A list creator acquires the depth value of the target object using a depth map created from the LFI of the current frame, and records this in a designation list after obtaining the reconstruction distance from the depth value. A corrector corrects the designation list. A main video creator creates and outputs a main video with reconstructed images focused at a focal length designated by the post-correction designation list as frames.

23 Claims, 21 Drawing Sheets

(56) References Cited

U.S. PATENT DOCUMENTS

2012/0300097 A1 11/2012 Ng et al.
2013/0033626 A1 2/2013 Ng et al.
2013/0121560 A1* 5/2013 Hirai .................. G06K 9/00261
382/154

* cited by examiner

FIG. 7A

| PRE-CORRECTION DESIGNATION LIST | | | | |
|---|---|---|---|---|
| t | x(t) | y(t) | d(t) | ... |
| 0 | 12 | 114 | 2 | ... |
| 1 | 13 | 115 | 3 | ... |
| 2 | 15 | 117 | 3 | ... |
| 3 | NULL | NULL | NULL | ... |
| 4 | 15 | 117 | 3 | ... |
| 5 | 22 | 119 | 10 | ... |
| 6 | 14 | 121 | 3 | ... |
| 7 | 15 | 120 | 2 | ... |
| ... | ... | ... | ... | ... |

FIG. 7B

| POST-CORRECTION DESIGNATION LIST | | | | |
|---|---|---|---|---|
| t | x(t) | y(t) | d(t) | ... |
| 0 | 12 | 114 | 2 | ... |
| 1 | 13 | 115 | 3 | ... |
| 2 | 15 | 117 | 3 | ... |
| 3 | 15 | 117 | 3 | ... |
| 4 | 15 | 117 | 4 | ... |
| 5 | 14 | 119 | 4 | ... |
| 6 | 14 | 120 | 4 | ... |
| 7 | 15 | 120 | 3 | ... |
| ... | ... | ... | ... | ... |

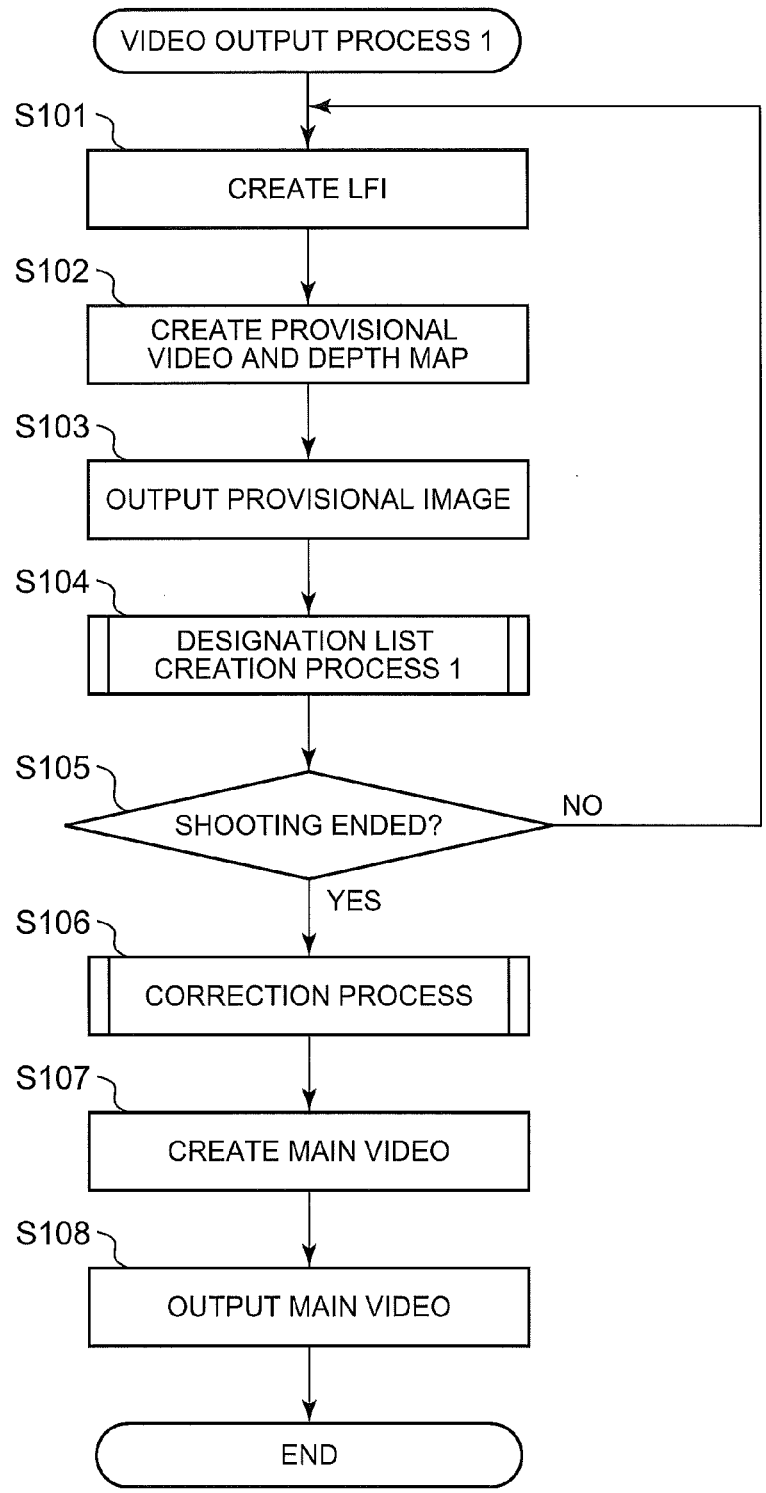

FIG. 12

| DEPTH VALUE-FOCAL LENGTH ASSOCIATION LIST ||
|---|---|
| DEPTH VALUE | FOCAL LENGTH (m) |
| 0 | 100 |
| 1 | 50 |
| 2 | 20 |
| 3 | 10 |
| 4 | 5 |
| 5 | 2 |

| DESIGNATION LIST | | | | | |
|---|---|---|---|---|---|
| t | x(t) | y(t) | d(t) | TYPE | ... |
| 0 | 12 | 114 | 2 | 1 | ... |
| 1 | 13 | 115 | 3 | 1 | ... |
| 2 | 15 | 117 | 3 | 1 | ... |
| 3 | NULL | NULL | NULL | – | ... |
| 4 | 15 | 117 | 3 | 0 | ... |
| 5 | 22 | 119 | 10 | 0 | ... |
| 6 | 14 | 121 | 3 | 0 | ... |
| 7 | 15 | 120 | 2 | 0 | ... |
| ... | ... | ... | ... | ... | ... |

IMAGE PROCESSING DEVICE AND IMAGE PROCESSING METHOD HAVING FUNCTION FOR RECONSTRUCTING MULTI-ASPECT IMAGES, AND RECORDING MEDIUM

CROSS-REFERENCE TO RELATED APPLICATION

This application claims the benefit of Japanese Patent Application No. 2012-145849, filed on Jun. 28, 2012, the entire disclosure of which is incorporated by reference herein.

FIELD

This application relates generally to technology for reconstructing multi-aspect image.

BACKGROUND

Technology has been known for photographing an object from different aspects and acquiring three-dimensional information on the object. Related to this, technology has been known for acquiring multi-aspect image (light field image) composed of multiple images of the object and reconstructing images in which the focal length and depth of field and/or the like are caused to change from the plural multi-aspect images.

SUMMARY

An image processing device according to a first aspect of the present invention comprises: a provisional acquirer that acquires, for each frame of a video, a provisional image for designating a position in the frame of an object on which to focus and for acquiring a depth map showing a depth of the object, each provisional image being reconstructed using a default value for provisional image creation from a multi-aspect image in which the object is shot from multiple viewpoints, and the multi-aspect image being a light field image that comprises multiple sub-images; a coordinate acquirer that acquires a coordinate of a focal position of the object on a provisional image plane, for each provisional image acquired by the provisional acquirer; a first setter that sets, for a frame of the video, a coordinate of the focal position acquired by the coordinate acquirer in a coordinate system including a component of a normal line axis of the frame; a second setter that resets the coordinate of the focal position for the frame of the video, based on coordinates of the focal position set by the first setter for other frames of the video; and an image acquirer that acquires, for each frame of the video, an image that is (i) reconstructed from the multi-aspect image in which the object is shot from each of the multiple viewpoints, and (ii) focused at a focal length determined from the coordinate of the focal position set by at least one of the first and the second setters.

An imaging device according to a second aspect of the present invention comprises: an imager; a provisional acquirer that acquires, for each frame of a video, a provisional image for designating a position in the frame of an object on which to focus and for acquiring a depth map showing a depth of the object, each provisional image being reconstructed using a default value for provisional image creation from a multi-aspect image in which the object is shot from each of multiple viewpoints, and the multi-aspect image being a light field image that comprises multiple sub-images; a coordinate acquirer that acquires a coordinate of the focal position of the object on a provisional image plane, for each provisional image acquired by the provisional acquirer; a first setter that sets, for a frame of the video, a coordinate of the focal position acquired by the coordinate acquirer in a coordinate system including a component of a normal line axis of the frame; a second setter that resets the coordinate of the focal position for the frame of the video, based on coordinates of the focal position set by the first setter for other frames of the video; and a reconstructor that reconstructs, for each frame of the video, an image that is focused at a focal length determined from the coordinate of the focal position set by at least one of the first and second setters, from the multi-aspect image in which the object is shot from each of the multiple viewpoints.

An image processing method according to a third aspect of the present invention comprises: provisionally acquiring, for each frame of a video, a provisional image for designating a position in the frame of an object on which to focus and for acquiring a depth map showing a depth of the object, each provisional image being reconstructed using a default value for provisional image creation from a multi-aspect image in which the object is shot from each of multiple viewpoints, and the multi-aspect image being a light field image that comprises multiple sub-images; acquiring a coordinate of a focal position of the object on a provisional image plane, for the each provisional image acquired; setting, for a first frame of a video, a coordinate of the focal position acquired in a coordinate system including a component of a normal line axis of the frame; resetting the coordinate of the focal position for the first frame of the video based on coordinates of the focal position set for frames of the video other than the first frame; and acquiring, for each frame of the video, an image that is (i) reconstructed from the multi-aspect image in which the object is shot from each of the multiple viewpoints, and (ii) focused at a focal length determined from the coordinate of the focal position set by at least one of the setting and the resetting.

A non-transitory computer-readable recording medium according to a fourth aspect of the present invention has stored thereon a program executable by a computer, the program controlling the computer to perform functions comprising: a provisional acquisition function that acquires, for each frame of a video, a provisional image for designating a position in the frame of an object on which to focus and for acquiring a depth map showing a depth of the object, each provisional image being reconstructed using a default value for provisional image creation from a multi-aspect image in which the object is shot from each of multiple viewpoints, and the multi-aspect image being a light field image that comprises multiple sub-images; a coordinate acquisition function that acquires a coordinate of a focal position of the object on a provisional image plane, for the each provisional image acquired by the provisional acquisition function; a first setting function that sets, for a frame of the video, a coordinate of the focal position acquired by the coordinate acquisition function in a coordinate system including a component of a normal line axis of the frame; a second setting function that resets the coordinate of the focal position for the frame of the video based on coordinates of the focal position set by the first setting function for other frames of the video; and an image acquisition function that acquires, for each frame of the video, an image that is (i) reconstructed from the multi-aspect image in which the object is shot from each of the multiple viewpoints, and (ii)

focused at a focal length determined from the coordinate of the focal position set by at least one of the first and the second setting functions.

BRIEF DESCRIPTION OF THE DRAWINGS

A more complete understanding of this application can be obtained when the following detailed description is considered in conjunction with the following drawings, in which:

FIG. 7A is a drawing showing an example of a pre-correction designation list according to the first preferred embodiment;

FIG. 7B is a drawing showing an example of a post-correction designation list;

FIG. 9 is a flowchart showing the video output process according to the first preferred embodiment;

FIG. 12 is a drawing showing an example of a depth value and focal length association list according to the first preferred embodiment;

DETAILED DESCRIPTION

Figure 1:
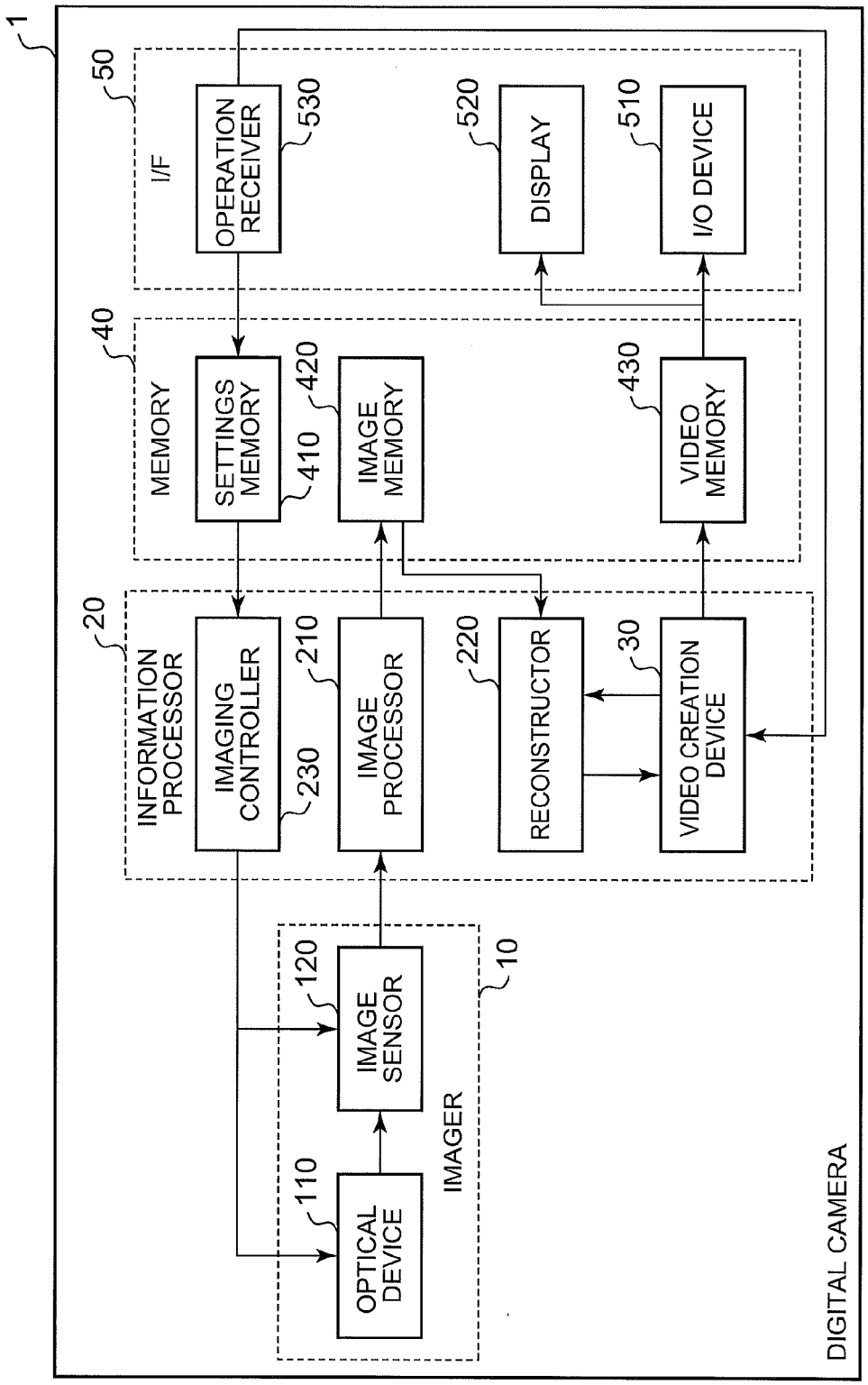
FIG. 1 is a drawing showing the composition of a digital camera according to a first preferred embodiment of the present invention.

A digital camera and video creation device (image processing device) according to preferred embodiments of the present invention are described below with reference to the drawings. Parts that are the same or corresponding in the drawings are labeled with the same reference symbols.

First Preferred Embodiment

A video creation device 30 (image processing device) according to the first preferred embodiment is installed in a digital camera 1 shown in FIG. 1. The digital camera 1 comprises the following functions i) to vi).

i) a function for successively shooting light field images comprising multiple sub-images of an object shot from multiple viewpoints;

ii) a function for creating a reconstructed image in which images of the object are reconstructed from the light field images;

iii) a function for creating a depth map showing the depth of the reconstructed image;

iv) a function for setting in each frame coordinates of the focal position of the reconstructed image, when creating video in which the reconstructed images are frames;

v) a function for correcting the coordinates that were set; and vi) a function for creating video in which reconstructed images focused at post-correction coordinates are the frames.

Of these, the video creation device 30 particularly comprises functions iv) to vi).

As shown in FIG. 1, the digital camera 1 comprises an imager 10, an information processor 20 containing the video creation device 30, a memory 40 and an interface (I/F) 50. Through this composition, the digital camera 1 acquires light ray information on an object from outside and creates a video of the object.

The imager 10 comprises an optical device 110 and an image sensor 120 and accomplishes imaging operations at a set frame rate.

Figure 2:
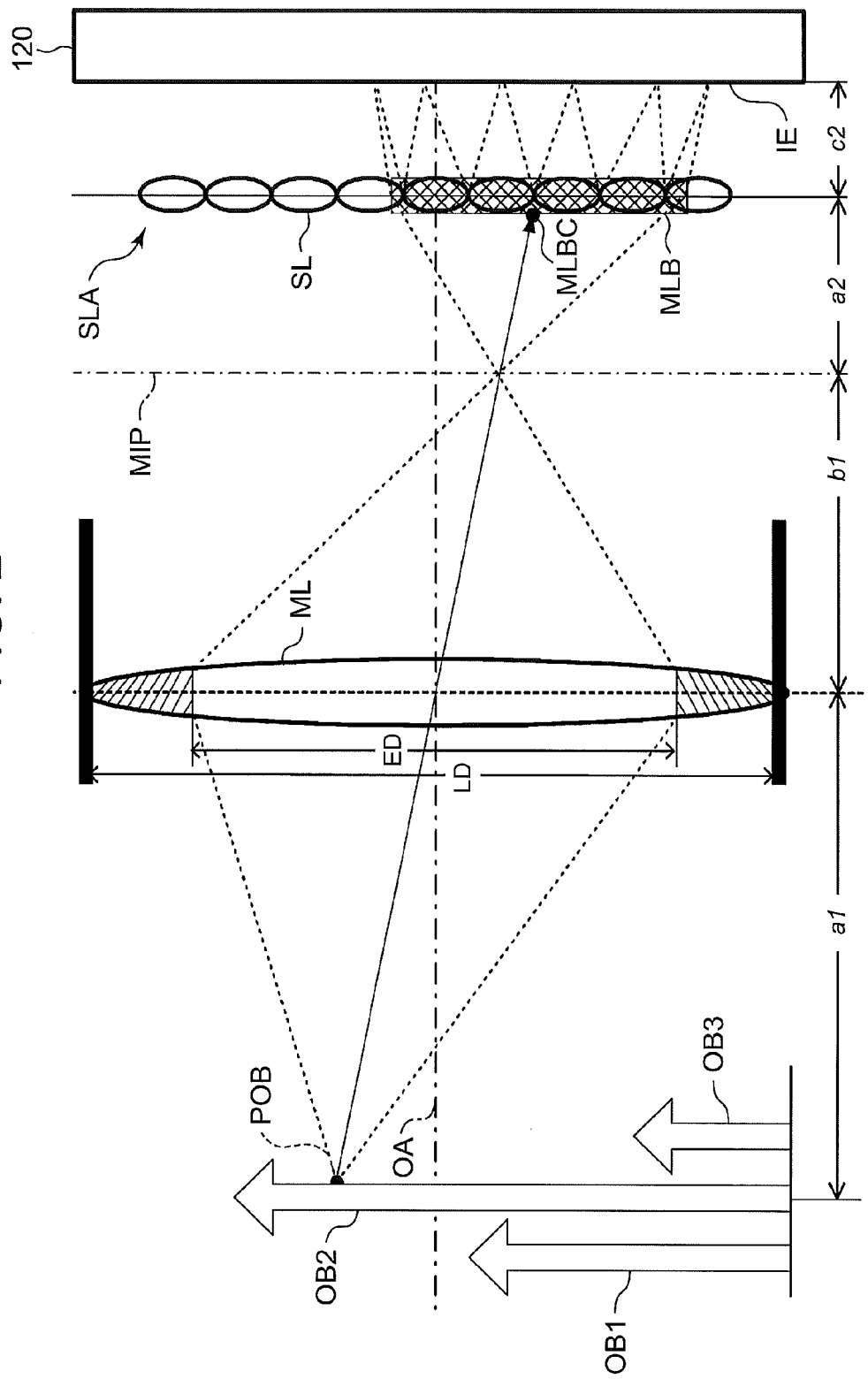
FIG. 2 is a drawing showing the composition of an optical system in the digital camera according to the first preferred embodiment.

The optical device 110 comprises a main lens ML and a sub-lens array SLA (micro-lens array), as shown in FIG. 2. The optical device 110 captures light rays from the outside (object OB1 to object OB3) using the main lens ML and projects on the image sensor 120 an optical image obtained with the optical centers of each sub-lens SL comprising the sub-lens array SLA as the visual point.

The image sensor 120 comprises, for example, an imaging elements such as a CCD (Charge Coupled Device), a CMOS (Complementary Metal Oxide Semiconductor) and/or the like, and a transfer device for transferring electrical signals generated by the imaging element to the information processor 20. With this physical composition, the image sensor 120 converts optical images projected by the optical device 110 into electrical signals and successively transfers such to the information processor 20.

The main lens ML comprises one or more convex lenses, concave lenses and/or aspherical lenses, and causes light from the objects at the time of shooting (for example, the objects OB1 to OB3) to form an image as an optical image on a virtual imaging plane MIP between the main lens ML and the sub-lens array SLA. The objects at the time of shooting (the objects OB1 to OB3) are multiple structures separated by differing distances from the main lens ML, as shown in FIG. 2.

The sub-lens array SLA comprises M×N sub-lenses (micro-lenses) SL arranged in a lattice on a plane. The sub-lens array SLA forms the optical image imaged by the main lens on the imaging plane MIP on an imaging plane IE of the image sensor 120 as an observed optical image with the optical center of those sub-lenses SL as the visual point. The space comprising from the plane the main lens ML forms and the plane the imaging plane IE forms is called the light field.

For the main lens ML, it is possible to define largest diameter LD and the effective diameter ED. The largest diameter LD is the physical diameter of the main lens ML. In contrast, the effective diameter ED is the diameter of the region of the main lens usable for shooting. The part of the main lens ML outside the effective diameter ED is a region ineffective for shooting and reconstructing images (ineffective region) because light rays entering and exiting the main lens ML are blocked by physical structures surrounding the main lens ML and various types of filters attached to the main lens ML.

The largest diameter LD and the effective diameter ED are measured in advance and stored in the memory 40 when the device is shipped from the factory.

In the example of FIG. 2, out of the multiple objects (objects OB1 to OB3), light rays from a portion POB of the object OB2 pass through a portion (effective part) comprising the effective diameter ED of the main lens ML and are projected onto the multiple sub-lenses SL. The region where light emitted from the portion POB of one object OB passes through the effective portion of the main lens ML and is projected onto the sub-lens array SLA in this manner is called the main lens blur MLB. In this, the position where the main light rays arrive is called the main lens blur center MLBC.

Below, the multiple objects are notated as objects OB1 to OB3 in order from the farthest (the largest distance from the main lens ML) object.

The distance from the optical center of the main lens ML to the imaging plane MIP of the main lens ML is called b1, the distance from the imaging plane MIP to the plane formed by the sub-lens array SLA is called a2 and the distance from the sub-lens array SLA to the imaging plane IE of the image sensor is called c2.

Through the above composition, the imager 10 images a light field image (LFI) containing information (arrival position, light intensity, direction) about light rays passing through the light field.

Figure 3A:
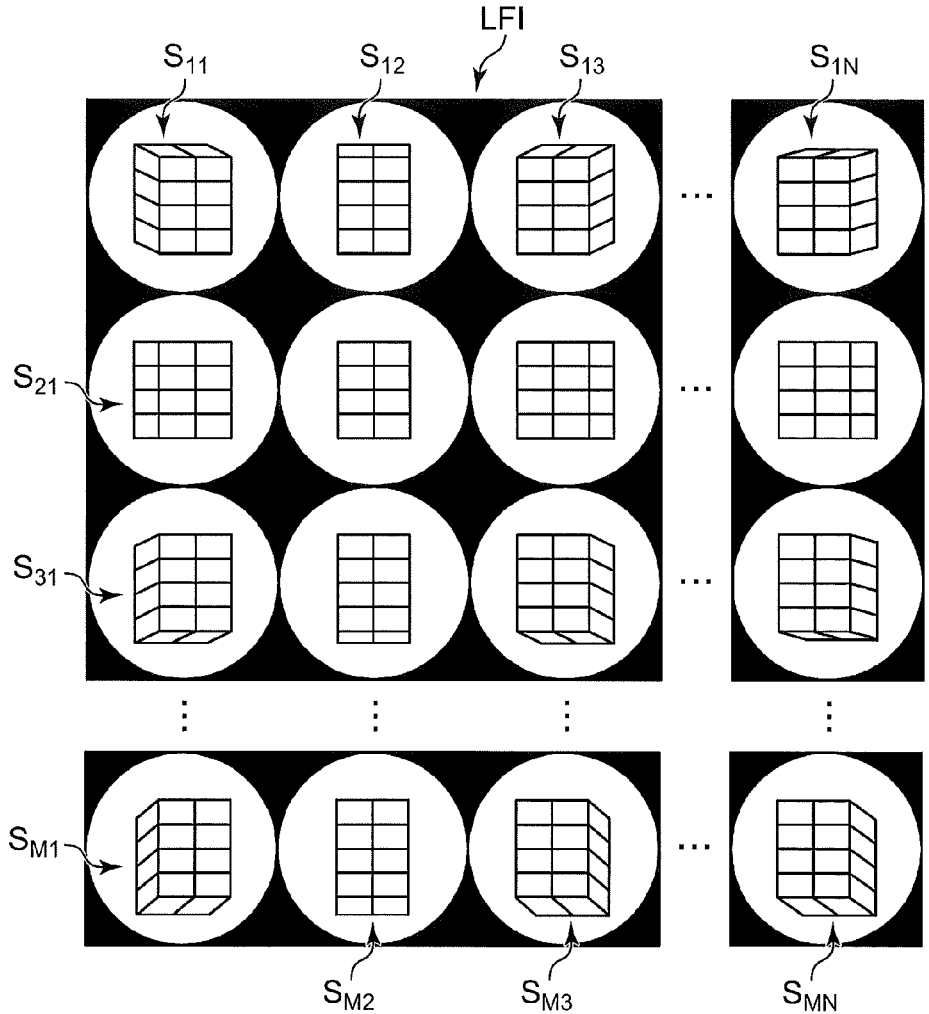
FIG. 3A is a drawing showing an example of a light field image according to the first preferred embodiment.

FIG. 3A shows one example of an LFI imaging the block-shaped object OB.

This LFI comprises images (sub-images SI, $S_{11}$ to $S_{MN}$) respectively corresponding to the M×N sub-lenses SL (micro-lenses) arranged in a lattice. For example, the sub-image $S_{11}$ on the top left corresponds to the image of the object OB imaged from the top left, and the sub-image $S_{MN}$ in the bottom right corresponds to an images of the object imaged from the bottom right.

Each sub-image is arranged at a position on the LFI corresponding to the position of the sub-lens that imaged the sub-image.

The sub-images in the ith row (one horizontal row of sub-images) $S_{i1}$ to $S_{iN}$ correspond to stereo images imaged by sub-lenses SL lined up horizontally in the ith row of the sub-lens array SLA. Similarly, sub-images in the jth column (one vertical row of sub-images) $S_{1j}$ to $S_{Mj}$ correspond to stereo images imaged by sub-lenses SL lined up vertically in the jth row of the sub-lens array SLA (micro-lens array).

The information processor 20 shown in FIG. 1 physically comprises a CPU (Central Processing Unit), RAM (Random Access Memory), an internal bus and an I/O port. With this kind of physical composition, the information processor 20 functions as an image processor 210, a reconstructor 220, a video creation device 30 and an imaging controller 230.

The image processor 210 acquires electrical signals from the image sensor 120 and converts the acquired electrical signals into image data (LFIs) based on imaging setting information contained in the setting information (including imaging setting information) stored in a settings memory 410 of the memory 40. The image processor 210 successively generates LFIs and stores such in an image memory 420 of the memory 40 at a speed corresponding to the set frame rate. Here, suppose that the LFIs are generated at the same frame rate as the below-described video. Below, data in which the series of shot LFIs are frames of video recorded in the image memory 420 is called LFI video.

Setting information recorded by the settings memory 410 is described below.

The reconstructor estimates the depth of the object for each pixel on the sub-image on an LFI. When the depth of the object is estimated, a calculation is made as to the extent to which pixels corresponding to that object are shifted on each sub-image. The size of that shift is a coefficient indicating depth. Furthermore, information (a light field depth map, LFDM) with coefficients indicating the estimated depth arranged at the position of each pixel is generated. The larger the depth coefficient, the more near side (a position close to the main lens ML) the object captured at that pixel is estimated to be.

Figure 3B:
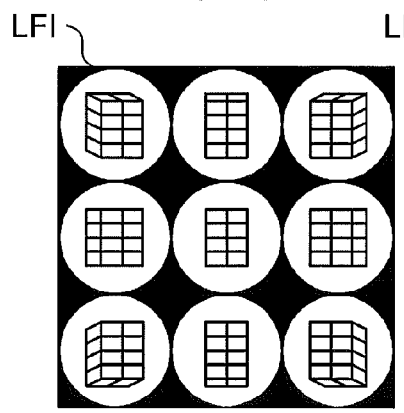
FIG. 3B is a drawing showing an overview of the light field image.
Figure 3C:
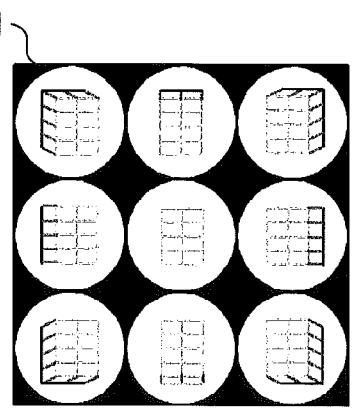
FIG. 3C is a drawing showing an example of a light field depth map.

The LFDM defines coefficients indicating the depth for each of the sub-pixels included in the LFI. FIG. 3C shows the LFDM associated with the LFI shown in FIG. 3B. In the LFDM, areas (the far side of the cuboid) that are deeper with respect to the LFI in which a cuboid object shown in FIG. 3B is shot are indicated by darker colors, while those on the near side (front surface) are indicated by lighter colors. Below, in depth maps positions at depth are similarly indicated by dark pixels, and position at near side are indicated by light pixels.

Here, the LFI and LFDM were explained as separate information, but the LFI and the LFDM may be a single data recorded by associating a pixel value (information maintained by the LFI) and depth coefficient (information maintained by the LFDM) for pixels arranged at given coordinates.

Here, the depth coefficient of the LFDM may be calculated based on an arbitrary method estimating the distance of the object at a pixel in the LFI, but in this preferred embodiment the calculation is made using the following method.

i) A sub-image comprising the LFI is targeted, and targeted sub-image is called target sub-image.

ii) The target sub-image is divided into image regions comprised of pixels that difference of pixel values are within a prescribed range. Furthermore, one of the image regions is selected as the target region.

iii) Sub-image on the right side of the target sub-image (or the left side when right side sub-image is absent, and in this case, left and right are reversed below) are extracted in order of position as SR1, SR2, . . . , SRk. Here, k is a natural number determined by settings.

iv) The centroid coordinates (x, y) of the target region are acquired. These coordinates are defined with respect to a coordinate system that origin is a center of each sub-image and independent in each sub-image.

v) The current pixel shift is called d. In the sub-image SR1, a corresponding region is arranged at a position corresponding to the target region of focused sub-image. At this time, the centroid of the corresponding region is positioned shifted to the right side by d. The sum of the squared difference (SSD) between the pixel value of each pixel in the target region and the pixel value of the corresponding pixel in the corresponding region is calculated. Similarly, the corresponding region at SR2 is positioned shifted to the right side by 2d and the SSD is calculated. The SSD is acquired for each through SRk, and sum of the absolute value of difference (SSSD) is obtained by each SSD, This is set as the evaluation value of d.

vi) The evaluation value is computed for each pixel shift d in the range of parallax that occurs. Of these, the pixel shift (d) having the smallest sum of sum of squared difference SSSD obtained is the pixel shift coefficient of pixels contained in the target region.

vii) The pixel shift coefficient is computed for all pixels in all sub-images, and the computed pixel shift coefficients are arranged at corresponding places in the pixels as LFDM depth coefficients.

Figure 4A:
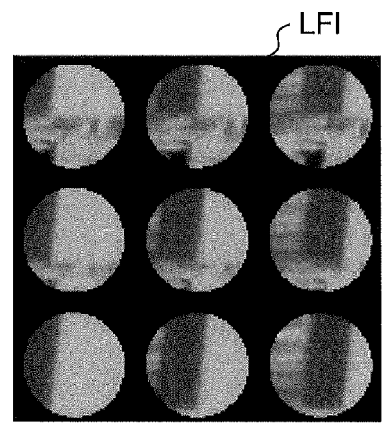
FIG. 4A is a drawing showing an example of a light field image according to the first preferred embodiment.
Figure 4B:
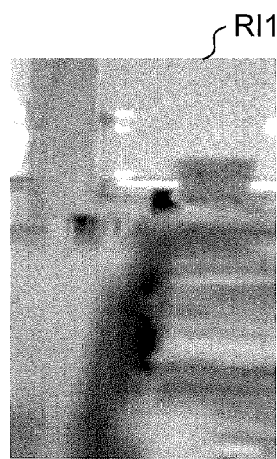
FIG. 4B is a drawing showing a reconstructed image reconstructed from the light field image.
Figure 4C:
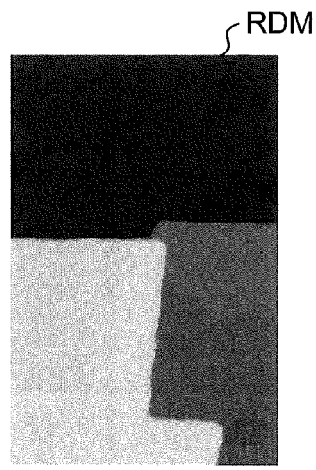
FIG. 4C is a drawing showing a reconstructed depth map.
Figure 4D:
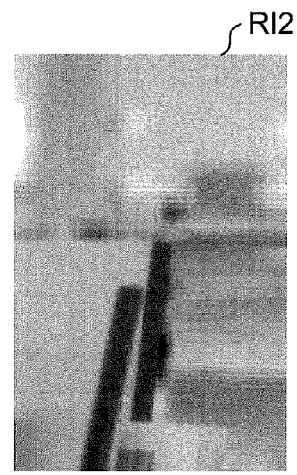
FIG. 4D is a drawing showing a reconstructed image.

The reconstructor 220 further generates the reconstructed image (for example, RI1 in FIG. 4B) that is a frame of the provisional video and the reconstruction depth map (RDM in FIG. 4C) from the light field image (for example, LFI in FIG. 4A) stored in the image memory 420 based on the setting information (default setting) stored in the settings memory 410. Furthermore, a reconstructed image (RI2 in FIG. 4D) that is a different focal length of RI1 is generated from the same LFI in accordance with a command from the video creation device 30. The RI2 is an image that is a frame of the video that is output (main video).

Each pixel of the depth map DM is set darker when the depth estimated for the object of the pixel is deeper (the object is far from the main lens ML) and lighter when the depth estimated for the object of the pixel is nearer The reconstructor 220 may create a reconstructed image and depth map through an arbitrary commonly known method from the LFI, but in this preferred embodiment this is created through the following light ray tracking.

Figure 5:
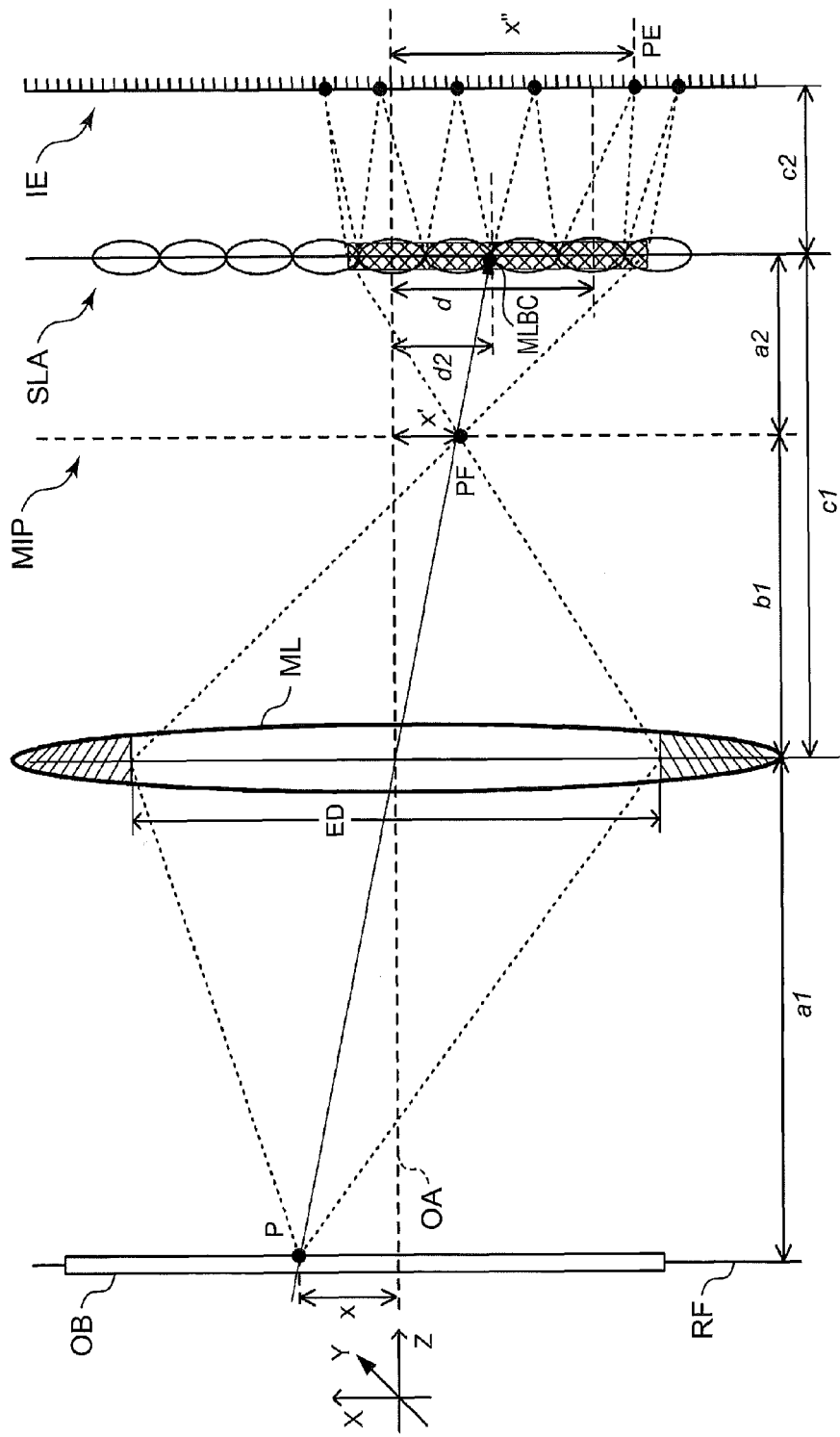
FIG. 5 is a drawing for explaining a light ray track according to the first preferred embodiment.

First, an image is set on the reconstruction plane RF (a virtual plane separated by a distance a1 from the main lens ML) designated by the setting information or the video creation device 30. At this time, light rays from a target position P (corresponding to the target pixel on the reconstructed image) of the object pass through the primary position of the main lens ML and arrive at the arrival position of the micro-lens array (MLBC on the sub-lens in FIG. 5). The position of the MLBC on the sub-lens can be obtained based on the shooting setting information. The range (the main lens blur MLB, the hashed region in FIG. 5) centered on the MLBC, where light from the target position arrives, is also obtained from the properties of the lens. The diameter of the main lens blur MLB is obtained using similar triangles from the distance a1 between the main lens ML and the reconstruction plane RF, the distance b1 between the main lens ML and the imaging plane MIP (calculated from a1 and the focal length $f_{ML}$ of the main lens ML), the distance a2 between the imaging lens MIP and the sub-lens array SLA, and the effective diameter ED of the main lens ML.

Next, the sub-lenses included in part or in whole in the main lens blur MLB are specified out of the sub-lenses SL that is included in the sub-lens array SLA. Then, the specified sub-lenses SL are successively selected as the target lens. At this time, area S where the target lens and the main lens blur overlap is obtained from the center position of the main lens blur, the diameter of the main lens blur MLB and the position and size of the sub-lens determined by setting information is set.

Pixels (corresponding pixels) on the sub-image at a position where light rays from the target pixel are imaged by the sub-lens are extracted.

Specifically, the corresponding pixels (corresponding to the arrival point PE) are calculated using the below procedure.

First, the distance b1 to the focal plane of the main lens ML corresponding to the reconstruction plane RF can be calculated from the following equation (1) using known numerical values a1 and $f_{ML}$.

$$b1 = \frac{a1 \times f_{ML}}{a1 - f_{ML}} \quad (1)$$

In addition, a2 can be obtained by subtracting b1 calculated using equation (1) from the known value c1.

Furthermore, the distance x' between the optical axis OA and the point (imaging point PF) imaged via the main lens ML from the target position P is calculated using equation (2) below that uses the distance a1 between the reconstruction plane RF and the main lens ML, the distance b1 between the main lens imaging plane MIP and the main lens ML, and the known value x (the distance between the target position P and the optical axis OA).

$$x' = x \cdot b1/a1 \quad (2)$$

Furthermore, the distance x″ between the arrival point PE and the optical axis OA is calculated using equation (3) below that uses the distance d from the optical axis OA to the main point of the target sub-lens SL, the distance x' calculated using the above equation (2), the distance c2 from the sub-lens array SLA to the imaging plane IE and the distance a2 from the main lens imaging plane MIP to the sub-lens array SLA.

$$x'' = (d_l - x') \times \frac{c2}{a2} + d_l \quad (3)$$

The reconstructor 220 extracts corresponding pixels corresponding to pixels (reconstructed pixels) on the reconstructed image by executing the above-described light ray tracking on each sub-lens with which the MLB overlaps. Furthermore, the area S where each sub-lens and the main lens blur overlap is the weighting w of each corresponding pixel.

The reconstructor 220 uses the corresponding pixels extracted in this manner and the weighting w to execute the below-described process and create a reconstructed image and depth map.

(1) Set one reconstructed pixel as the target pixel and extract the corresponding pixels and weighting w.

(2) Acquire the pixel value of the corresponding pixels of each sub-lens with reference to the LFI.

(3) Set the corrected pixel value obtained by multiplying the acquired pixel value by the weighting coefficient (that weighting w) as.

(4) Calculate the correct pixel value for all extracted corresponding pixels, and then these calculated-correct pixel values are summed, which is called the pixel value of the reconstructed pixel.

(5) Acquire the depth coefficients of the extracted corresponding pixels with reference to the LFDM.

(6) Set the depth coefficient of the reconstructed depth map, which is the mode value of the acquired depth coefficients.

(7) For each reconstructed pixel, execute (1) to (6) and determine the pixel value and depth coefficient.

The video creation device 30 creates video with the provisional images (for example, RI1 in FIG. 4B) created by the reconstructor 220 based on setting information as frames, and records such in the video memory 430 as a provisional video, and outputs such to a display 520 of the I/F 50. Furthermore, the video creation device 30 receives from an operation receiver 530 of the I/F 50 coordinate information for the position where the video should be focused as designated by the user using the provisional video, and sets information (designation information) designating the coordinates of the focal position including the focal distance of the video from the received coordinate information. Furthermore, the video creation device 30 sends a command for creating a reconstructed image positioned at the reconstruction plane RF corresponding to the focal length of the set designation information to the reconstructor 220.

Furthermore, the video creation device 30 receives the reconstructed images (for example, RI2 in FIG. 4D) created by the reconstructor 220 in response to the command. Furthermore, the video creation device 30 creates the main video using as frames the reconstructed images transferred from the reconstructor 220.

The video creation device 30 stores the created main video (reconstructed video) in the video memory 430. The composition of the video creation device 30 and the process of creating the provisional video and the main video are described below.

The imaging controller 230 controls the imager 10 based on imaging setting information stored in the settings memory 410 of the memory 40, and shoots objects (for example, objects OB1 to OB3) using the imager 10.

The memory 40 comprises a main memory device comprising a RAM (Random Access Memory) and/or the like, and an external memory device comprising non-volatile memory such as a flash memory, a hard disk, and/or the like.

The main memory device loads control programs and information stored in the external memory device and is used as a work area for the information processor 20.

The external memory device stores in advance control programs and information for causing the below-described processes to be run by the information processor 20, and transfers these control programs and information to the main memory device in accordance with instructions from the information processor 20. In addition, the external memory device stores information transferred from the interface 50 and information based on processes of the information processor 20, in accordance with instructions from the information processor 20.

The memory 40 functionally comprises the settings memory 410, the image memory 420 and the video memory 430.

The settings memory 410 stores imaging setting information, default settings for provisional video creation, and video settings for creating the main video. The imaging setting information includes the shutter speed, F-stop, information specifying exposure time, focal length $f_{ML}$ of the main lens, and distance between the main lens ML and the sub-lens array SLA as imaging parameters that change when imaging. In addition, the settings memory 410 stores information relating to the physical composition of the digital camera 1, such as the position of each sub-lens SL on the sub-lens array SLA and the distance c2 between the sub-lens array SLA and the imaging plane IE, and/or the like.

The default settings comprise information and creation parameters indicating contents of processes for creating provisional videos. In this preferred embodiment, the reconstruction setting information is information for creating a provisional video (and the depth map thereof) with a prescribed resolution and a prescribed focal length through the above-described reconstruction process.

The video settings include the below-described video frame rate, resolution, focal point coordinates determination method, coordinates correction method, correction parameters and/or the like.

The settings memory 410 transfers the imaging parameters to the imaging controller 230, the default settings to the reconstructor 220 and the video settings to the video creation device 30.

In addition, the settings memory 410 adds information relating to physical composition to the imaging setting information when the imager 10 shoots an object, and transfers such as shooting setting information to the image processor 210 and the reconstructor 220.

The image memory 420 stores the LFIs successively created by the image processor 210. The image memory 420 transfers stored images to the reconstructor 220.

The interface (labeled the I/F in the drawings) 50 is a composition relating to the interface between the digital camera 1 and the user thereof or external devices, and comprises an I/O device 510, a display 520 and an operation receiver 530.

The I/O (input/output) device 510 physically comprises a USB (Universal Serial Bus) connector and video output terminals, and an input/output controller. The I/O device 510 outputs information stored in the memory 40 to an external computer, and transfers information transferred from outside to the memory 40.

The display 520 comprises a liquid crystal display device, an organic EL (Electro Luminescence) display and/or the like, and displays a screen for inputting setting information stored in the settings memory 410 and a screen for operating the digital camera 1. In addition, the display 520 displays video stored in the video memory 430.

The operation receiver 530 includes, for example, various buttons provided on the digital camera 1 and a touch panel provided on the display 520. In addition, the operation receiver 530 includes a transferer for detecting information (touched coordinate position and/or the like) on operations accomplished with the various buttons and the touch panel and transferring such to the memory 40 and the information processor 20. In addition, the operation receiver 530 transfers information of user operations to the memory 40 and the information processor 20.

Next, the composition of the video creation device 30 is described with reference to FIGS. 6A and 6B.

The video creation device 30 physically comprises an information processor 31, a main memory 32, an external memory 33, an input/output device 36 and an internal bus 37.

The information processor 31 comprises a CPU (Target Processing Unit) and a RAM (Random Access Memory).

The main memory 32 has the same physical composition as the main memory device of the memory 40. The external memory 33 has the same physical composition as the external memory device of the memory 40, and stores a program 38. The input/output device 36 comprises an input/output terminal and an I/O device, and realizes input and output of information with the video creation device 30, various components of the information processor 20, the memory 40, the interface 50 and/or the like. The internal bus 37 connects the information processor 31, the main memory 32, the external memory 33 and the input/output device 36.

The information processor 31, the main memory 32, the external memory 33, the input/output device 36 and the internal bus 37 may be a function block realized by internal circuits of the information processor 20 of the digital camera 1, the memory 40 and the interface 50.

The video creation device 30 copies data and the program 38 stored in the external memory 33 to the main memory 32, and executes the below-described processes for creating and outputting video by the information processor 31 executing the program 38 using the main memory 32.

Figure 6A:
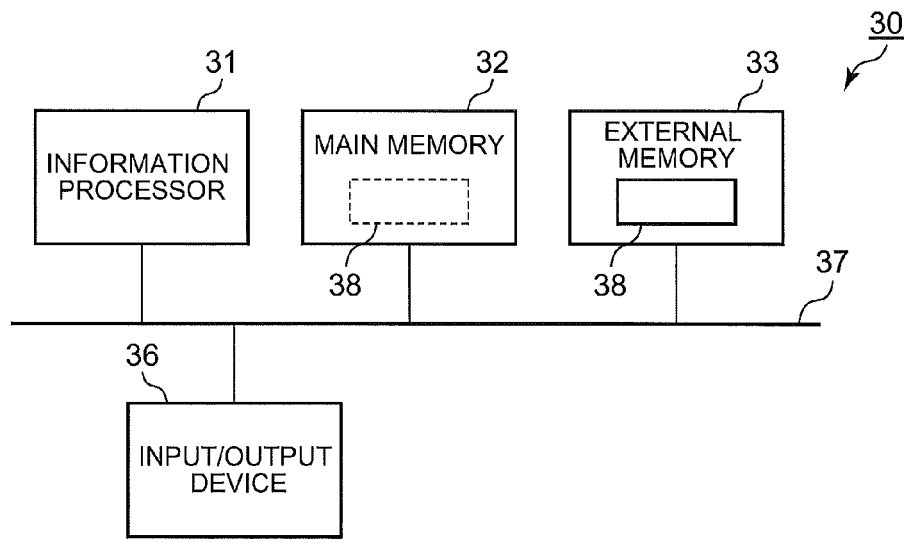
FIG. 6A is a drawing showing the physical composition of a video creation device according to the first preferred embodiment.
Figure 6B:
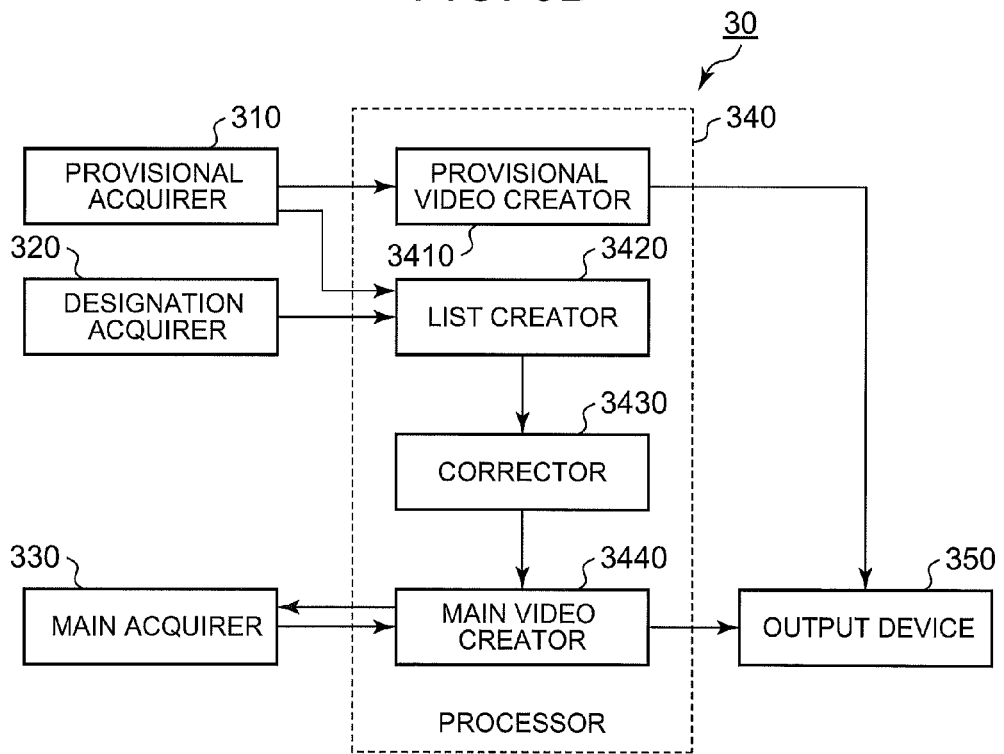
FIG. 6B is a drawing showing the functional compositions of the video creation device.

The video creation device 30, through the above-described physical composition, functions as a provisional acquirer 310; a designation acquirer 320; a main acquirer 330; a processor 340 including a provisional video creator 3410, a list creator 3420, a corrector 3430 and a main video creator 3440; and an output device 350, as shown in FIG. 6B.

The provisional acquirer 310 acquires provisional images (images for settings) created by the reconstructor 220 using the default settings, and the depth map thereof. The provisional acquirer 310 transfers the acquired provisional images to the provisional video creator 3410 of the processor 340, and transfers the acquired depth map to the list creator 3420. Here, the provisional acquirer 310 acquires the provisional images and depth map at the same rate as the frame rate of the main video determined by the video settings.

The designation acquirer 320 acquires information about operations designating the position of the object on which to focus executed by the user using the operation receiver 530 (operations designating the designated coordinates). The designated coordinates are coordinates on the provisional image at the position where the user viewing the provisional image displayed on the touch panel touched the object considered to be important, for example. In the main video, the focal length is set so as to focus on the object at the position touched.

The designation acquirer 320 successively transfers the acquired designated coordinates to the list creator 3420.

The main acquirer 330 transfers commands including creation parameters (reconstruction settings) created as a result of the processes of the processor 340 to the reconstructor 220. At this time, the creation parameters include the focal length obtained from below-described corrected designation information as a reconstruction distance a1. Furthermore, the main acquirer 330 acquires the reconstructed image (main image) created by the reconstructor 220 in accordance with commands. The main acquirer 330 transfers the acquired main image to the main image creator 3440.

The processor 340 creates a provisional video and a main video using information acquired by the provisional acquirer 310, the designation acquirer 320 and the main acquirer 330, and outputs such to the output device 350. In order to execute this kind of process, the processor 340 includes the provisional video creator 3410, the list creator 3420, the corrector 3430 and the main video creator 3440.

The provisional video creator 3410 creates a video (provisional video) with images acquired by the provisional acquirer 310 as frames, and transfers such to the output device 350. Here, the provisional video has the same frame rate and frame count (corresponding to the total time of the video) as the main video.

The provisional video creator 3410 may, when creating the provisional video, do frame interpolation of images acquired by the provisional acquirer 310, or execute prescribed blur adding processes and/or the like.

The list creator 3420 creates designation information including the focal length for imaging the reconstructed image and information for setting the focal length (coordinates of the focal point position), based on the designated coordinates acquired by the designation acquirer 320. Furthermore, the list creator 3420 creates a list (designation list) recording designation information in frame units from the designation information.

FIG. 7A shows an example of the designation list created by the list creator 3420. The designation list is a list associating and recording the time (t) on the video of each frame in the main video, the designated coordinates (x(t), y(t)), and a reconstruction distance (d(t)). The reconstruction distance is a depth value of the depth map corresponding to the designated coordinates. The vector (x(t), y(t), d(t)) is three-dimensional coordinates of the target object in a coordinate system centered on the optical center (or the center of the reconstructed image (main video frame)) of the main lens ML. The d(t) is the normal line component (for example, the optical axis OA in FIG. 2 and FIG. 5) of the frame. This vector is called the coordinates of the focal point position. The method by which the list creator 3420 creates the designation list is described below. The list creator 3420 can be called a first setter because it sets a coordinate of the focal point position for each frame. In addition, the corrector 3430 can be called a second setter because it sets a coordinate for the frame based on coordinates set by the list creator 3420 for other frames.

In this preferred embodiment, the provisional video and the main video have the same frame rate, so if designation information is obtained for each frame of the provisional video, designation information can be designated in all frames of the main video. The time t can be viewed as frames of the provisional video. The time t may be the number of the frames arranged chronologically.

At this time, the designated coordinates stored in the designation list include cases in which values cannot be detected (null) or mistaken values (the row for t=5 in the example of FIG. 7A) due to trembling of the user's finger or detection mistakes of the touch panel or errors in depth values in the depth map. The list creator 3420 transfers the created designation list to the corrector 3430.

The corrector 3430 corrects the designation list (a list of focal position coordinates) transferred from the list creator

3420 in order not to produce a video that gives viewers a sense of discomfort, prior to creation of a video using the designation list.

Figure 8A:
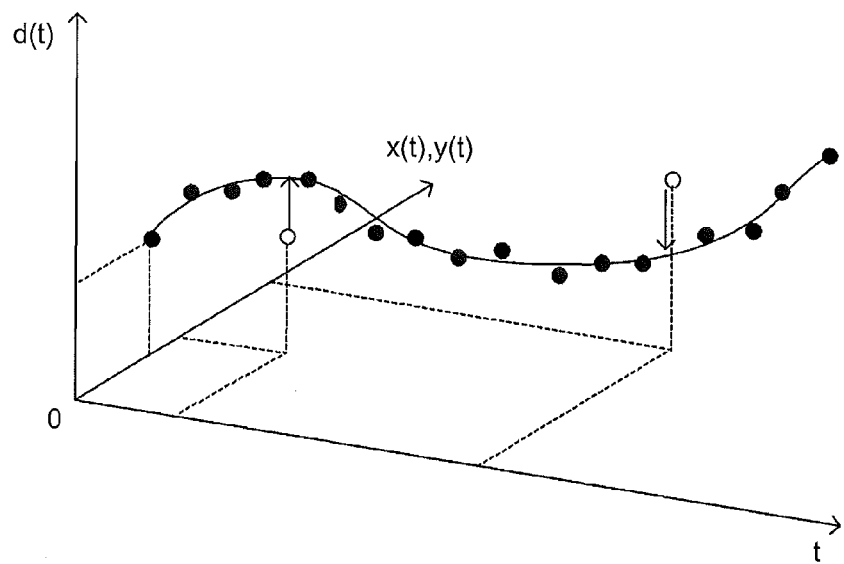
FIG. 8A is a drawing showing an example of a correction process according to the first preferred embodiment.
Figure 8B:
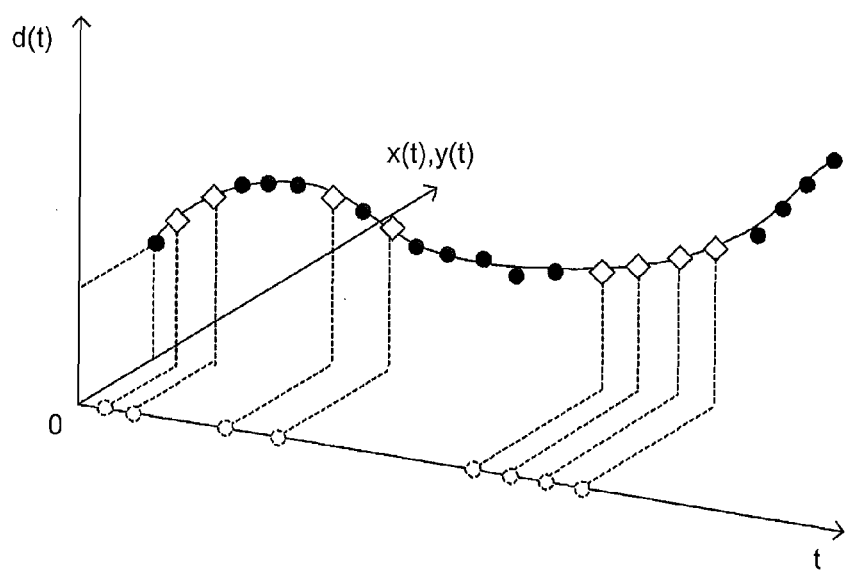
FIG. 8B is a drawing showing another example of the correction process according to the first preferred embodiment.

An overview of the correction process executed by the corrector 3430 is explained with reference to FIGS. 8A and 8B. FIGS. 8A and 8B are examples of graphs obtained by plotting the designation information stored in the designation list in three-dimensional coordinates along axes of the coordinates (x(t), y(t)), time (t) and distance d(t), with x(t) and y(t) shown as a single parameter (coordinate) for purposes of the drawing. In this graph, the designation information is shown as black dots or white dots.

There are cases when mistaken values such as are shown by white dots in FIG. 8A appear in the designation list due to the effects of operation mistakes caused by trembling fingers and/or the like, detection mistakes by the touch panel, image noise or errors in estimating the object distance. When d(t) is a mistaken value, if a video is created focused on the position of the mistaken value, the focus would suddenly shift to an unintended distance before and after that frame. Hence, the corrector 3430 estimates the true value and corrects the designation information so as to create a video that is not uncomfortable. In FIGS. 8A and 8B, the post-correction values are indicated by curve lines.

In addition, there are cases when the designation information is null (dotted circle in FIG. 8B) due to designation information for the provisional video not being obtained because of touch mistakes, operation detection mistakes and/or the like. For convenience, the null case is shown as points when d(t) and x(t) y(t) are 0. When there is no designation information, the focal length of the reconstructed image is not determined, so the user cannot create the intended video. Hence, the corrector 3430 corrects the null values (replenish missing information) by estimated values (diamonds in FIG. 8B) estimated from values before and after.

The method by which the corrector 3430 corrects the designation list is described below.

The corrector 3430 transfers the corrected designation list (for example, FIG. 7B) to the main video creator 3440. In the example of FIG. 7B, the mistaken values (row for t=5) before correction (FIG. 7A) are corrected so as to approach the neighboring values (rows for t=4, t=6). In addition, the row for the null value (t=3) is replaced by values estimated from surrounding values.

When the corrected designation list is transferred from the corrector 3430, the main video creator 3440 transfers to the main acquirer 330 designation information of rows corresponding to frame of the video in the designation list, for each frame of the video. In response to this, the main acquirer 330 in response to this creates reconstruction parameters with the d(t) of that row as the reconstruction distance a1 and causes the reconstructor 220 to create a reconstructed image that is used by the reconstruction parameter. Furthermore, the main video creator 3440 receives image generated by the reconstructor 220 from the main acquirer 330 and makes received reconstructed image as the frame of the video. Furthermore, the main video creator 3440 executes a video interpolation process and contrast adjustment to create the main video, which is transferred to the output device 350.

The output device records the transferred videos (provisional video and main video) in the video memory 430. Furthermore, the digital camera 1 displays the provisional video or the main video on the display 520, or transfers such to the outside via the I/O device 510.

Next, the process executed by the digital camera 1 is described with reference to flowcharts. The digital camera 1 starts a video output process 1 shown in FIG. 9 when the operation receiver 530 receives an operation instructing shooting of an object.

In the video output process 1, first the image processor 21 creates an LFI from image information acquired from the imager 10 and shooting setting information acquired from the settings memory 410 (step S101). Then, the image processor 210 associates LFI with the shooting time and stores it in the image memory 420. For example, the LFI shot initially is called t=0, and the LFIs shot in subsequent loops are called t=1, 2, 3 . . . .

Next, the reconstructor 220 creates a provisional image and depth map from light ray tracking using the shooting setting information and default settings, from the LFIs newly stored in the image memory 420 (step S102).

Then, the provisional acquirer 310 acquires the provisional image and the provisional video creator 3410 executes contrast correction, brightness correction and/or the like, makes the frame (provisional images) of the provisional video and outputs such to the output the frame to the output device 350 (step S103).

Next, in order to set the parameters (focal length and/or the like) of the main images that are frames of the main video, a process for recording designation information in the designation list (designation list creation process 1) is executed (step S104).

Figure 10:
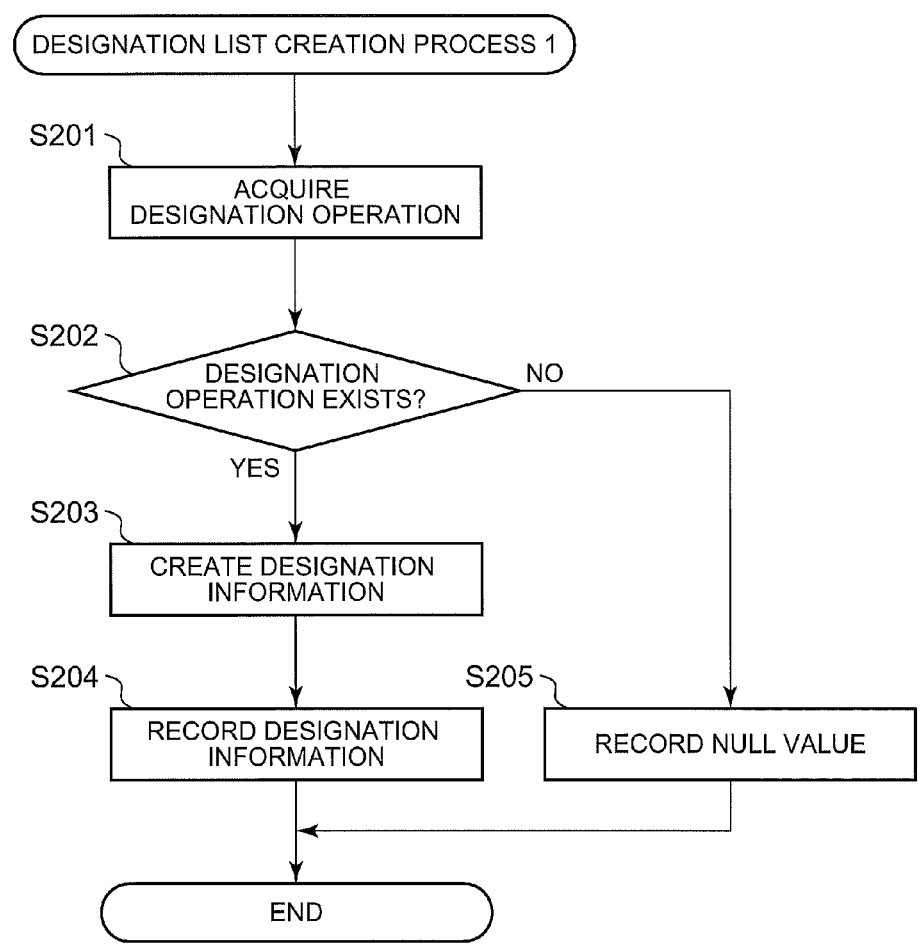
FIG. 10 is a flowchart showing the designation list creation process according to the first preferred embodiment.

The designation list creation process 1 executed in step S104 is described with reference to FIG. 10. In the designation list creation process 1, first the designation acquirer 320 acquires information on operations by which the user designates the positions of provisional images using the operation receiver 530 (step S201).

Next, the list creator 3420 determines whether or not information about a designation operation has been obtained (step S202). When operation information has not been obtained, such as when the user has not touched the touch panel or a touch operation cannot be detected (step S202: No), the list creator 3420 records a null value in the row of the designation list for the current time.

On the other hand, when information about a designation operation has been obtained (step S202: Yes), the list creator 3420 next acquires the coordinates and depth value of that position (step S203). Specifically, the list creator 3420 acquires the coordinates of the touch position from the operation receiver 530. Then, the list creator 3420 acquires the depth value of the acquired coordinates by referring to the depth map corresponding to the present provisional image. The list creator 3420 registers acquired coordinate value and depth value in the row of the current time in the designation list (step S204).

When a parameter (including a null value) is recorded in the designation list in step S204 or step S205, the designation list creation process 1 ends.

Returning to FIG. 9, when parameters corresponding to frames of the provisional video in the current display are acquired in the designation list by the designation list creation process 1, next the processor 340 determines whether or not shooting has finished (step S105). Specifically, the processor 340 determines whether or not the operation receiver 530 has received an operation instructing a stop of shooting from the user, and when such has not been received, the processor 340 determines that shooting is to be continued (step S105: No). In this case, the process from step S101 is repeated for the next frame of the provisional video.

In contrast, when a shooting finish instruction has been received, the processor 340 determines that shooting has finished (step S105: Yes). Next, the corrector 3430 executes a process for correcting acquired parameters (a correction process, herein called correction process 1) (step S106).

Figure 11:
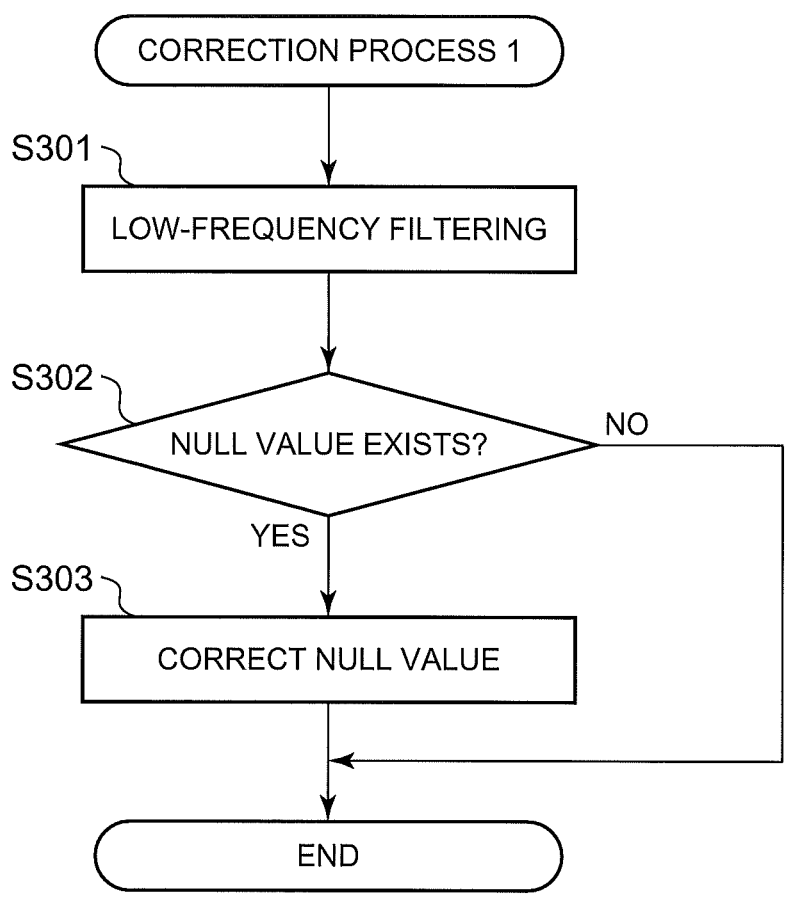
FIG. 11 is a flowchart showing the correction process according to the first preferred embodiment.

The correction process 1 executed in step S106 is explained with reference to FIG. 11. In the correction process 1, first the corrector 3430 removes mistaken values and executes a process for preventing discomfort caused by extreme shifts in focal length. Here, low-frequency filtering is executed to remove high-frequency components from parameters of the pre-correction designation list (step S301). Specifically, digital filtering is executed in the time axis direction for each of the coordinates (x(t), y(t), d(t)) of the focal position of the designation list. Or, filtering may be executed with the coordinates as one vector. At this time, the null values are removed from the calculation targets.

The specific filtering method is defined by the setting information stored in the settings memory 410. Here, suppose that a smoothing filter is set in order to remove noise (chattering and/or the like) caused by sensing lost by the touch panel or trembling of the fingers at the time of operation. A weighted average filter or a weighted median filter is usable as the smoothing filter. With a weighted average filter, there is an effective low-pass effect with regard to trembling of fingers at the time of operation, and it is preferable for the top number and weight to be set so that the cutoff frequency is around 0.5 Hz. In addition, a weighted median filter is effective against sudden outliers such as sensing lost by the touch panel, and it is preferable for the filter window and weighting to be set so that the cutoff frequency is around 0.5 Hz.

When filtering ends, next the corrector 3430 determines whether or not there is a null value in the designation list (step S302). Specifically, the corrector 3430 determines whether or not there is a row of null values in the designation list. When there is a row of null values (step S302: Yes), the corrector 3430 determines that there is a frame for which an effective designation value was not obtained, so correction is executed to replace the null values with values obtained based on the surrounding designation information (step S303).

In order to make this replacement, it is possible to use a commonly known, arbitrary method for estimating true values, such as an interpolation method, a linear supplement method or a maximum post-probability estimation method and/or the like, but here suppose that curve estimation through a nonlinear least-squares method is used. That is to say, the corrector 3430 estimates the curve v=f(t) using a least-squares method from vectors other than the null values, with each row of the designation list as the vector (v=(x(t), y(t), d(t)). Then, the time (t) of the null value is substituted into the estimated curve and an estimated value is calculated. Furthermore, the estimated value replaces the null value.

As a curve estimation using the least-squares method, arbitrary commonly-known methods are usable, such as the Newton method, the pattern method, the Gauss-Newton method and/or the like. Here, first an estimation is made using the Newton method, hypothesizing that the curve is a quadratic equation, and when the minimum error obtained is smaller than a prescribed threshold value, that curve is set as the estimation result. On the other hand, when the minimum error is larger than the threshold value, estimation is made hypothesizing a cubic equation. From there, curve estimation is executed by similarly raising the order, and the lowest-order curve for which there is an error smaller than the prescribed threshold value is set as the estimation result.

The range of vectors (in other words, the range of t) to which the least-squares method is applied may be several seconds. In this case, it is possible to make virtually all functions created to be first-order or second-order functions by determining the function while sliding this range successively.

Next, if there are no rows of null values (step S302: No) or step S303 finishes, the correction process 1 ends.

Returning to FIG. 9, when the designation list is corrected by the correction process 1, next the main video creator 3440 creates the main video using the post-correction designation list (step S107). Specifically, the LFIs recorded in the image memory 420 are selected in chronological order of shooting, and then, from the selected LFIs, are reconstructed at the focal length recorded in the designation list in the order stored in the post-correction designation list. The association between the focal length and the depth value is determined for example by a depth value-focal length association list (FIG. 12) stored in the settings memory 410.

For example, when the post-correction designation list is the one in FIG. 7B, first from the LFI when t=0, the reconstruction plane RF is set to the distance (a1=20 m in FIG. 5) corresponding to the depth value 2. Then, a reconstructed image is created by the reconstructor 220 from the light ray track and reconstructed image is made the frame of t=0. Then, for the frame when t=1, the reconstruction plane RF is set to the distance (a1=10 m in FIG. 5) corresponding to the depth value 3 from the LFI of t=1 and a reconstructed image is created. Each frame is similarly created from there, and contrast adjustment and light intensity correction and/or the like are executed and then the main video is crated.

Furthermore, the main video creator 3440 outputs the created main video to the output device 350 (step S108). The output video is stored in the video memory 430 and is later displayed on the display 520, or is output to the outside by the I/O device 510.

As explained above, with the digital camera 1 according to this preferred embodiment, it is possible to create a video focused on a position by simply designating the object on which to focus after viewing the provisional image displayed. Consequently, it is possible to create a video focused on the desired position without troublesome operations such as setting the focal length of each frame of the video.

In addition, the video creation device 30 according to this preferred embodiment automatically estimates the focal length of frame in which the focal length could not be obtained, based on the focal lengths of frames for which the focal lengths were obtained. Consequently, it is possible to create a video with no discomfort even if focal length information was not obtained. In particular, when designating a focal length by designating a position through operation of a touch panel, there are cases that the designation information will not be obtained due to the finger separating from the touch panel, or the touch operation not being detected, and/or the like. With this preferred embodiment, it is possible to create a video with no discomfort (with high satisfaction) even in such cases.

Furthermore, corrections are made to attenuate the high-frequency components about the focal length of each frame, so there are no sudden changes in focal length in the created video. Consequently, it is possible to create a video that does not give discomfort to the viewer.

In particular, when the position of a provisional image is designated as in this preferred embodiment and the focal length is determined based on the depth value of the designated position, there are cases when the focal length of the frame is far out of place for a number of frames due to depth estimation errors. In addition, when touches are made so as to follow a small object, there are cases that a focal length set far away from the intended focal length in a specific frame due to mistakes in designation operations such as the finger moving too far and deviating from the object and/or the like, or operation detection mistakes of the operation receiver 530.

That is to say, although deviated values occurs easily in the designation information, in this preferred embodiment, information designating the focal length of the video is corrected prior to creation of the video, so even if deviated values occur, it is possible to create video with a high satisfaction that does not give discomfort to the viewer.

The method of attenuating the high-frequency components is not limited to low-pass filtering, for example detecting deviated values (using a commonly known method such as the Smirnov-Grubbs test and/or the like), and for the deviated values to be corrected to approach the surrounding values.

Furthermore, about designated positions on the provisional image, acquire depth value calculated from the degree of shifting on sub-images and acquired depth value become a focal length. As a result of this, it is possible to set a focal length reflecting the three-dimensional information of the object included in the LFIs. In addition, estimation of depth is accompanied by errors, but it is possible to ease discomfort caused by errors through a correction process. That is to say, in this preferred embodiment, it is possible to create images with no discomfort that are focused on the target object based on three-dimensional information on the LFIs even if there are errors in detecting depth values.

Second Preferred Embodiment

Next, a second preferred embodiment of the present invention is explained. The second preferred embodiment differs from the first preferred embodiment in the content of the correction process executed by the corrector 3430, but is the same as the first preferred embodiment in the composition other than this.

The digital camera 1 and video creation device 30 according to this preferred embodiment have the same composition as corresponding equipment according to the first preferred embodiment.

Figure 13:
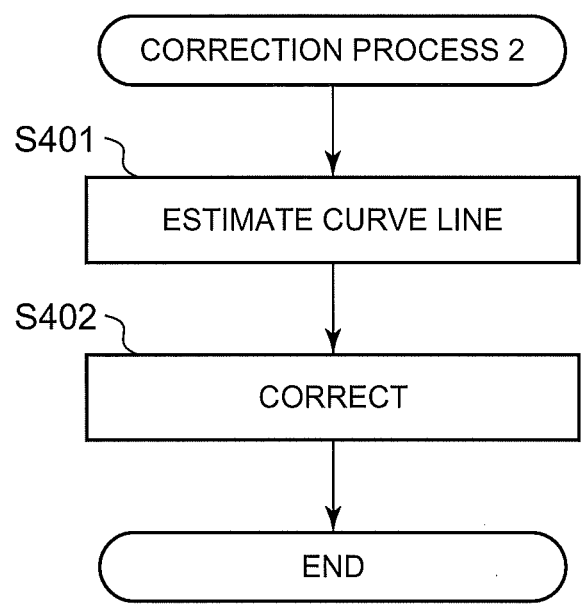
FIG. 13 is a flowchart showing the correction process according to a second preferred embodiment of the present invention.

The digital camera 1 and the video creation device 30 execute the video output process 1 of FIG. 9 the same as the first preferred embodiment except that the correction process executed in step S106 is the correction process 2 shown in FIG. 13.

When the process reaches step S106 in the video output process 1, the corrector 3430 starts the correction process 2 shown in FIG. 13. In the correction process 2, first the curve v=f(t) is estimated with each row of the designation list as the vector (v=x(t), y(t), d(t)) showing the coordinate of the focal position. The corrector 3430 may execute curve estimation using a commonly known arbitrary method such as maximum likelihood estimation, maximum post-probability estimation, Bayes estimation and/or the like, but here suppose the curve estimation is executed using a least-squares method (step S401).

As the curve estimation using a least-squares method, a commonly known arbitrary method such as the Newton method, the pattern method, the Gauss-Newton method and/or the like can be used. Here, it is hypothesized that the curve is an n-order equation (for example, n=2), and estimation is made using the Newton method omitting null values, the estimation is determined to be successful when the minimum error obtained is smaller than a prescribed threshold value, and that curve is set as the estimation result. On the other hand, when the minimum error is larger than the threshold value, next estimation is made hypothesizing that this is an (n+1)-order equation, and when a minimum error smaller than the threshold value is obtained, the curve of the (n+1)-order equation is the estimation result. Following this, similarly the order is increased and curve estimation is executed, and the curve of lowest order for which an error smaller than the prescribed threshold value is obtained (estimation is successful) is determined to be the estimation result. At this time, a predetermined maximum order (for example, n=5) is determined, and estimation is not made for curves greater than the maximum order.

In curve estimation, one curve may be estimated for all frames of the video (t=0 to Max), or the video may be divided on the time axis per prescribed conditions and estimation of separate curves made for each divided unit. The method of partitioning the video may be automatically partitioning into prescribed lengths, or the user may designate partition positions. Or, the range of a vector applying the least-squares method may be set as several seconds and the function determined while sliding this range in succession for a set time. Most functions created by sliding in this manner will be first- or second-order.

The reason for limiting the range of curve estimation in this manner is that it is not easy for a single function to express multiple states designated by the user (in other words, the sequence as a whole becomes too complex resulting an order too high), and in addition, there are virtually no videos with complex depth designations within several seconds.

Then, the corrector 3430 corrects based on estimation results, under the determination that the estimation result is at the area and focal length intended by the user who executed the touch operation (step S402). Specifically, data in each row of the designation list is converted to estimated values obtained by substituting the time (t) into the estimated curve. At this time, null values are similarly corrected, so it is possible to supplement missing values.

When correction ends, the correction process 2 ends.

When the correction process 2 ends, the digital camera 1 creates and outputs the video similar to the first preferred embodiment using the post-correction designation list.

As explained above, with the digital camera 1 according to this preferred embodiment, it is possible to create video using designation information (focal length) corrected through curve estimation. Consequently, it is possible to create video in accordance with intentions after estimating the intentions of the video creator (the user who executed the touch operation), even if there are deviated values or missing values in the designation information.

In addition, with a composition in which the lowest-order curve for which estimation succeeded is made the estimation result, over-calculating is prevented and the quantity of computations becoming enormous is prevented. In addition, because the order of the curve is not larger than a maximum value, a result that omits high-frequency components of the estimation information is obtained. When the focal length of a video changes significantly in a short period, discomfort is given to the viewer, but it is possible to ease such discomfort with this composition.

Third Preferred Embodiment

Figure 14:
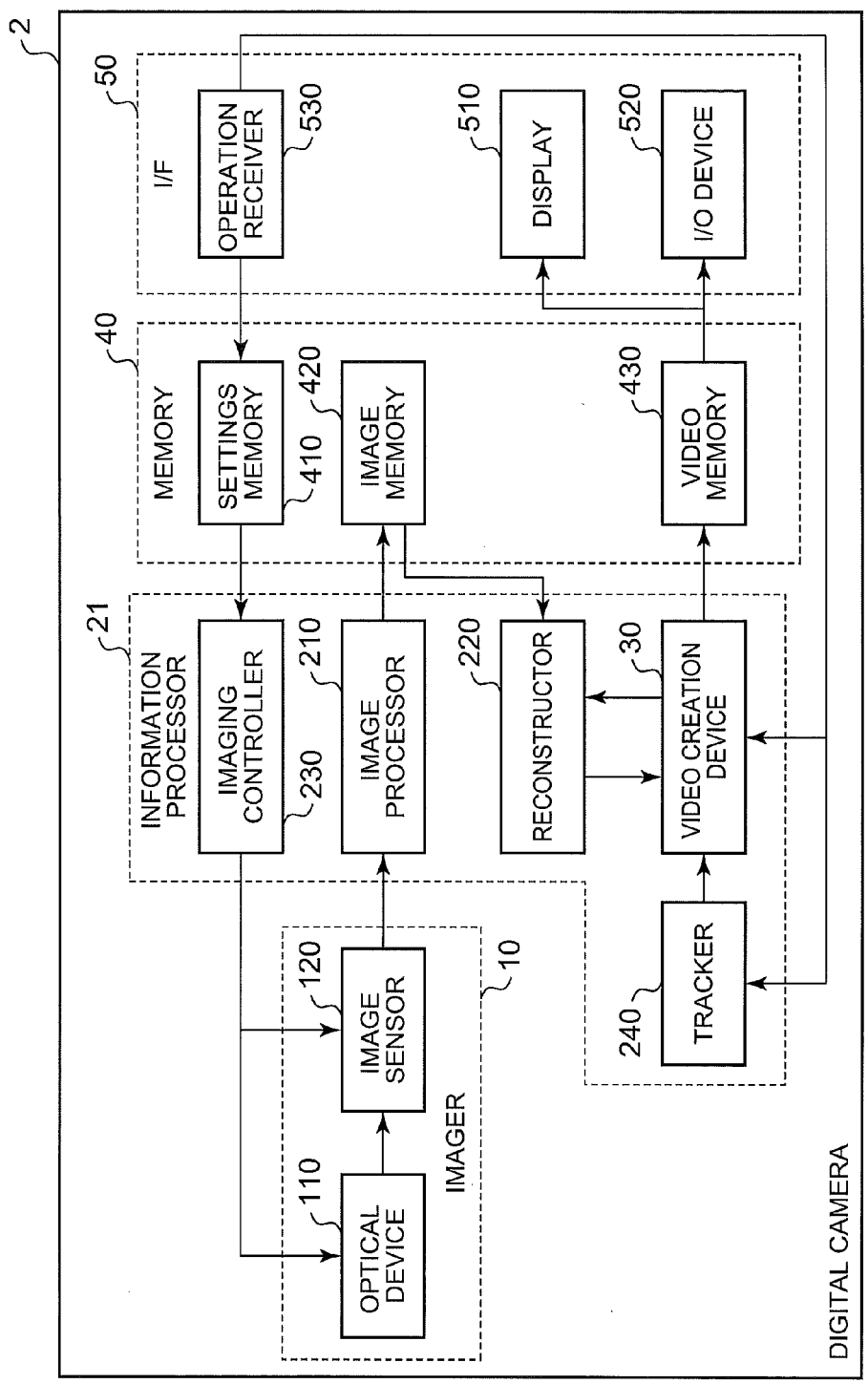
FIG. 14 is a drawing showing the composition of a digital camera according to a third preferred embodiment of the present invention.

Next, a digital camera 2 according to a third preferred embodiment of the present invention is explained. The digital camera 2 according to this preferred embodiment is characterized in that the information processor 21 includes a tracker 240, as shown in FIG. 14. Other compositions are the same as the digital camera 1 according to the second preferred embodiment.

The tracker 240 receives operations designating the object of a provisional video from the operation receiver 530, specifies the target object (tracked object) that is the target of tracking from the received operation, and extracts a feature quantity. Then, the (tracked object) is tracked on the provisional video using the extracted feature quantity, and the position of the tracked object in each frame is specified. The tracker 240 transfers the specified position information to the video creation device 30 as designation information.

The tracker 240 may specify the position of the tracked object using a commonly known arbitrary method such as a Mean-Shift search method using the SIFT (Scale Invariant Feature Transform) feature quantity, a search method using a Haar-like feature quantity and/or the like, but in this preferred embodiment suppose the below-described method is used.

The video creation device 30 according to this preferred embodiment has different processes executed by the various components but otherwise has the same physical composition and functional composition as the first preferred embodiment (see FIGS. 6A and 6B).

Figures 15, 16:
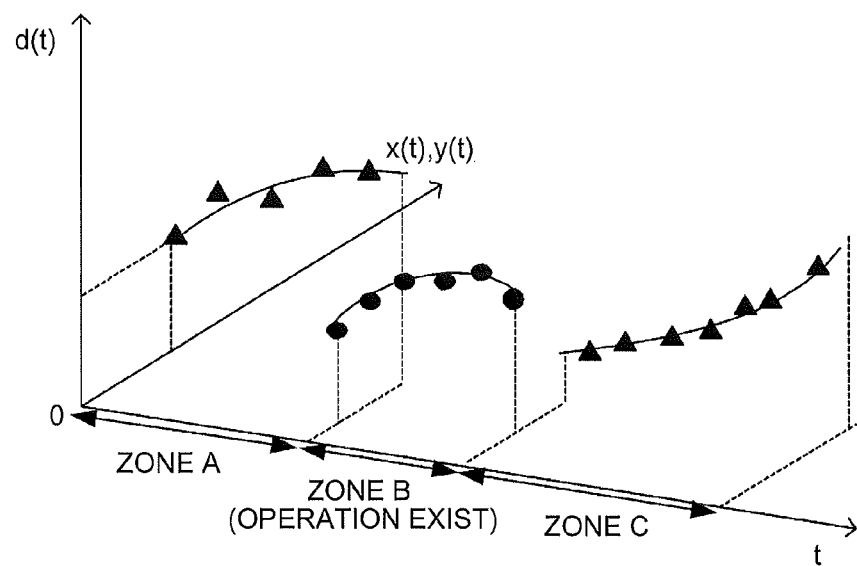
FIG. 15 is a drawing showing an example of the correction process according to the third preferred embodiment.
FIG. 16 is a drawing showing an example of the designation list according to the third preferred embodiment.

The video creation device 30 according to this preferred embodiment classifies and stores in the designation list the designation information (the black triangles in zone A and zone C) based on the position of the target object (tracked object) tracked by the tracker 240, and the designation information (the black dots in zone B) based on the user's designation operations. Consequently, the designation list created by the list creator 3420 of the video creation device 30 according to this preferred embodiment records, in addition to the designation list (FIG. 7A) of the first preferred embodiment, type is recorded as shown in FIG. 16. In the example of FIG. 16, the rows where the "type" is 0 are based on coordinates of the tracked object extracted by the tracker 240, and rows where the "type" is 1 are coordinates designated by the user's designation operations.

In this preferred embodiment, when designation operations and tracking results from the tracker 240 are both obtained, the list creator 3420 gives priority to the designation operations. That is to say, when designated coordinates are obtained through designation operations as shown in zone B of FIG. 15, the coordinates of the target object (tracked object) that was tracked are discarded. This is because the user who set the target object that is the object of tracking has deliberately designated a target position through the operation, so it is determined that this designation operation more strongly reflects the user's intentions.

The corrector 3430 executes different curve estimations for the zone based on tracking results from the tracker 240 (zone A and zone C) and zones based on designation operations (zone B), and corrects the designation list based on these estimation results. This is because curves along which the tracked object traced by the tracker 240 moves on the video and curves of coordinates of the target object the user designates through an operation can be thought of as independent.

Furthermore, when one type of zone is divided by the other type of zone, curves are estimated independently for the divided zone. In the example in FIG. 15, different curves are estimated for zone A and zone C. This is because when a single curve is estimated for divided zones of the same type, errors tend to become large due to the effect of the divided zone.

Next, the processes executed by the digital camera 2 and the video creation device 30 are explained. The digital camera 2 starts a video output process 2 shown in FIG. 17 upon the operation receiver 530 receiving an operation instructing shooting of an object.

In the video output process 2, first the process of the tracker 240 extracting the feature quantity of the tracked object (extraction process) is executed (step S501).

Figure 18:
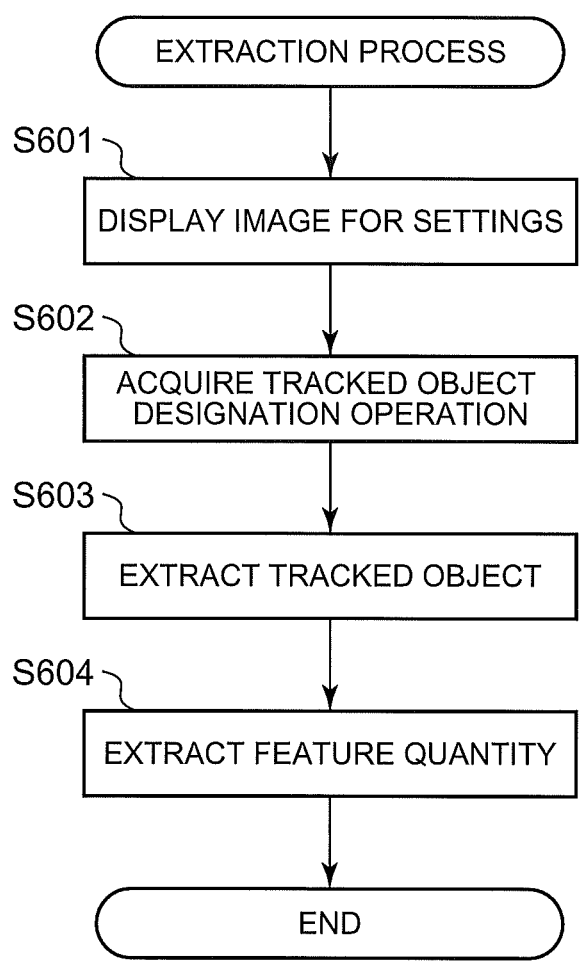
FIG. 18 is a flowchart showing an extraction process according to the third preferred embodiment.

The extraction process executed in step S501 will be explained with reference to FIG. 18. In the extraction process, first the provisional video creator 3410 obtains the provisional images created from the most recent LFIs from the provisional acquirer 310, and displays the acquired provisional images as setting images on the display 520 (step S601).

Next, the tracker 240 acquires information about the operation of the user designating the tracked object (step S602). Specifically, the user views the setting image displayed in the display 520 and designates a portion of the target object using the operation receiver 530, by touching the object on which to focused. The tracker 240 acquires this operation information (coordinate information).

The tracker extracts the tracked object based on the designation operation (step S603). Specifically, the tracker 240 extracts as the region on which the tracked object is projected a region having the same depth value as the pixel (designated pixels) at the coordinates designated by the designation operation and continuing to pixels having a similar color.

Or, the tracker 240 tries to extract the face of a person including the designated pixel through a facial recognition algorithm, and when face is extracted, makes the region containing that face the region where the tracked object is shown.

When extraction of the tracked object ends, next the tracker 240 extracts the feature quantity of the tracked object (step S604). Specifically, the tracker divides the region of the tracked object into blocks, computes an intensity gradient histogram for each block and extracts the HOG (Histograms of Oriented Gradients) feature quantity by executing normalization and integration. The tracker 240 extracts and records the feature quantity, then the extraction process ends.

Returning to FIG. 17, when the feature quantity of the tracked object is extracted in step S501, next the digital camera 2 executes steps S502 to S504 the same as steps S101 to S103 of the video output process 1 (FIG. 9) of the first preferred embodiment.

When the provisional images are output in step S504, next a process for creating the designation information and recording such in the designation list (designation list creation process 2) is executed (step S505).

Figure 19:
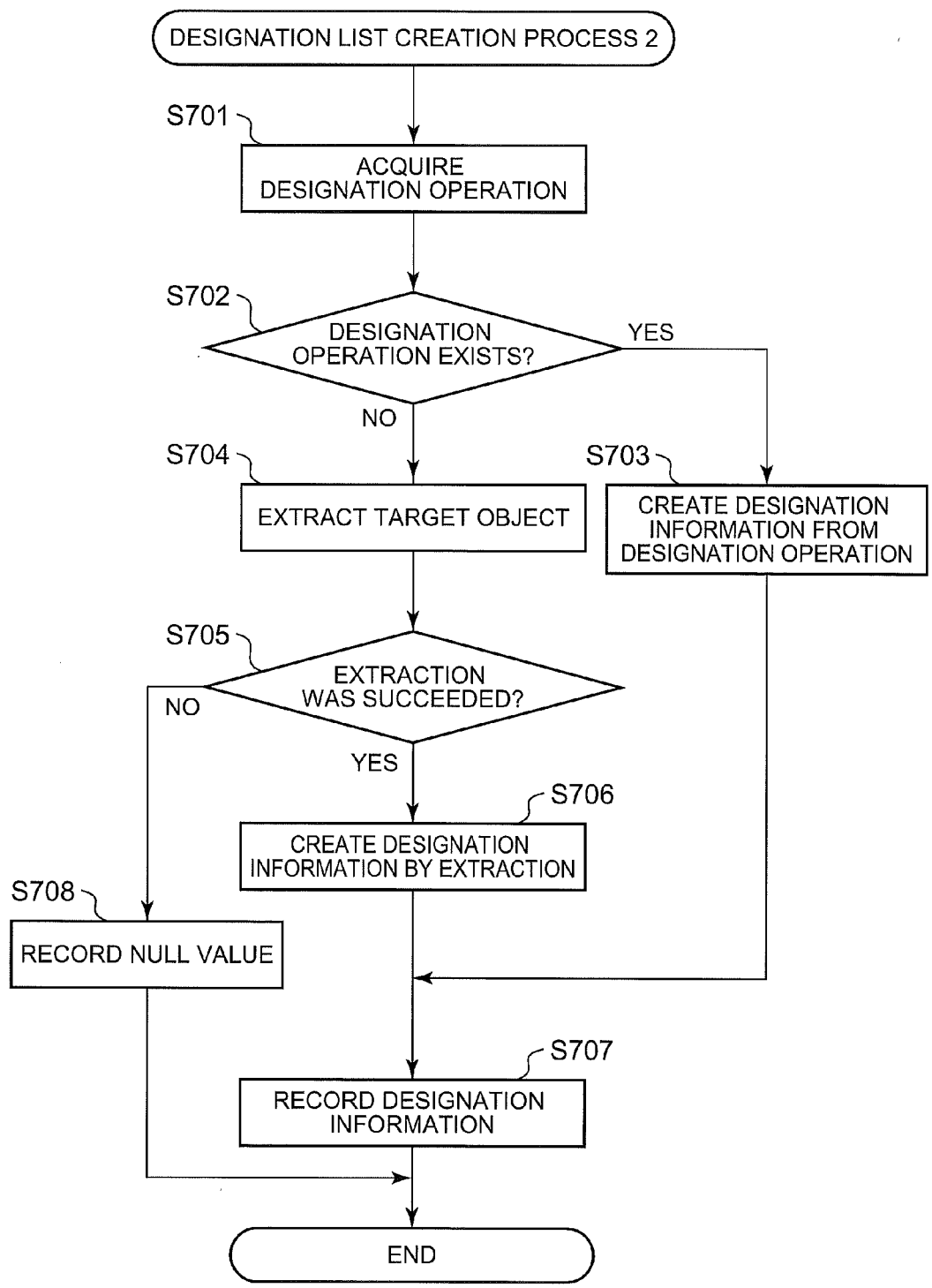
FIG. 19 is a flowchart showing the designation list creation process according to the third preferred embodiment.

The designation list creation process 2 executed in step S505 will be explained with reference to FIG. 19. In the designation list creation process 2, first the designation acquirer 320 acquires information about the designation operation including whether or not there was a designation operation (step S701).

Next, the list creator 3420 determines whether or not there was a designation operation (step S702). When a designation operation designating coordinates was executed and coordinate information was obtained (step S702: Yes), the list creator 3420 creates designation information based on the designation operation (step S703). At this time, information indicating that the obtained designation information is based on a designation operation is added in addition to the process in step S203 of the designation list creation process 1 (FIG.

10) of the first preferred embodiment. Specifically, the list creator 3420 sets the category of the "type" of designation list shown for example in FIGS. 16 to 1. The process then moves to step S707.

On the other hand, when no designation operation designating coordinates has been executed (step S702: No), next the tracker 240 extracts the tracked object on the provisional image (step S704). Specifically, the tracker 240 extracts the position with highest similarity to the feature quantity of the tracked object extracted by the extraction process (FIG. 18).

Next, the tracker 240 determines whether or not extraction was successful (step S705). Specifically, the similarity between the feature quantity at the position extracted in step S704 and the feature quantity extracted by the extraction process is computed and the tracker 240 determines success when the similarity is greater than a prescribed threshold value and determines an extraction failure if the similarity is not greater than the threshold value. The similarity is, for example, the SSD (Sum of Squared Difference) of each parameter of the feature quantity.

When extraction is succeeded (step S705: Yes), the coordinates of the position the tracker 240 extracted (the centroid of the extracted region) is obtained and transferred to the designation acquirer 320. Then the designation acquirer 320 transfers the transferred coordinates to the list creator 3420. The list creator 3420 creates a designation list from the transferred coordinates (step S706). Specifically, the list creator 3420 acquires the depth value of the transferred coordinates. Or, the list creator 3420 may acquire the depth value that is the mode value of the depth values of each pixel in the extracted region. Then, the list creator 3420 creates the designation information from the transferred coordinates and the acquired depth value. Then, the list creator 3420 adds information indicating that the obtained designation information is based on tracking. Specifically, this means setting the category of "type" in the designation list shown for example in FIG. 16 to 0.

When designation information is created in either step S703 or step S706, the list creator 3420 records the designation information in the current row of the designation list (step S707).

On the other hand, when there was a failure in extraction in step S705 (step S705: No), the list creator 3420 determines that effective designation information was not obtained and thus records a row of null values in the designation list, the same as in step S204 of the designation list creation process 1 (FIG. 10) of the first preferred embodiment (step S708). At this time, a null value ("–" in FIG. 16) is recorded in the "type" category.

When the row of the designation list corresponding to the current frame is recorded in either step S707 or step S708, the designation list creation process 2 ends.

Returning to FIG. 17, in the designation list creation process 2, when designation information corresponding to the frame of the provisional video currently displayed is recorded in the designation list, the processor 340 determines whether or not shooing has ended (step S506), the same as step S105 of the video output process 1 (FIG. 9) of the first preferred embodiment. When it is determined that shooting is continuing (step S506: No), the process from step S502 is repeated for the next frame of the provisional video.

On the other hand, when it is determined that shooting has ended (step S506: Yes), next the corrector 3430 executes a process (correction process, herein called correction process 3) for correcting the designation list (step S507).

Figure 20:
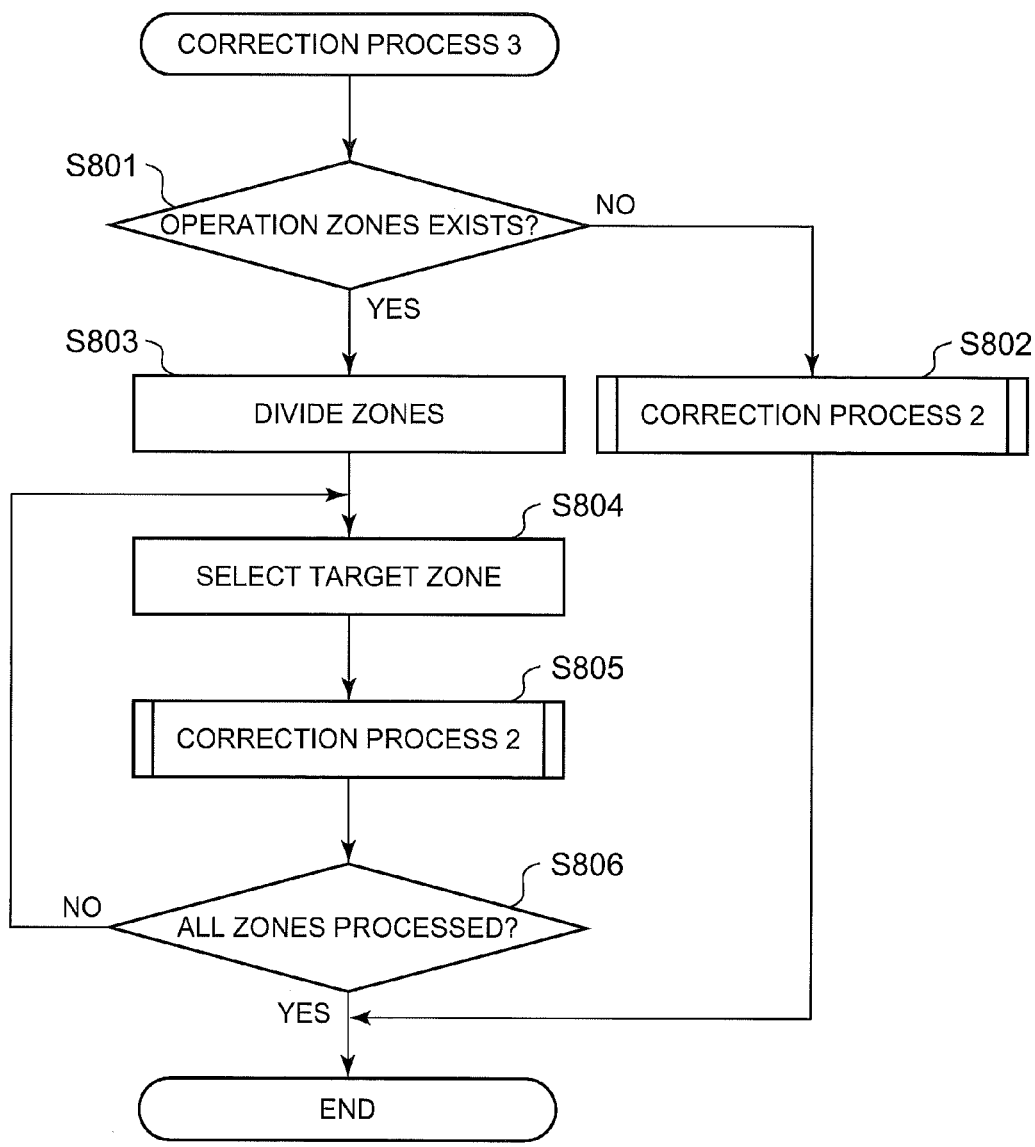
FIG. 20 is a flowchart showing a correction process according to the third preferred embodiment.

The correction process 3 executed in step S507 will be explained with references to FIG. 20. In the correction process 3, first the corrector 3430 determines whether or not an operation zone (a portion corresponding to zone B in FIG. 15, for example) exists in the designation list (step S801). Specifically, the determination is made as to whether or not there is a position in the designation list where a row having a "type' category of 1 continues beyond a prescribed threshold value (for example, a row number corresponding to 0.5 second in the video), and when such exists, the determination is that there is an operation zone, while when such does not exist, the determination is that there is no operation zone. Or, it would be fine to determine as operation zones those zones in which rows having a "type" category of 1 are larger than a prescribed ratio and longer than a prescribed threshold value.

When it is determined that there is no operation zone (step S801: No), the correction process 2 (FIG. 13) is executed the same as in the second preferred embodiment, curve estimation is executed as a single zone and the designation list is corrected based on the estimation results. Designation information based on operation results for positions not determined to be operation zones (rows with a "type" category of 1) is handled as a null value based on the determination of erroneous operation or erroneous detection.

On the other hand, when it is determined that an operation zone is exist (step S801: No), the corrector 3430 divides the designation list into zones (step S803). Specifically, the designation list is divided into the above-described operation zones and zones based on tracking results (parts corresponding to zone A and zone C in FIG. 15, for example).

Next, the corrector 3430 selects one out of the divided zones as the target zone (step S804). Then, the correction process 2 of FIG. 13 is executed for the target zone, and the various parts of the designation list are corrected based on curve estimations (step S805). Designation information based on operation results (rows with a "type" category of 1) at positions not determined to be an operation zone are handled as null values, based on the determination that such are the result of erroneous operation or erroneous detection. In addition, designation information based on tracking results (rows with a "type" category of 0) at positions determined to be an operation zone are handled as null values, based on the determination that such are the result of operation mistakes or operation detection mistakes.

Next, the corrector 3430 determines whether or not the above-described process was executed for all divided zones in step S803 (step S806). When there is an unprocessed zone (step S806: No), the process is repeated from step S804 with the next unprocessed zone as the target zone. On the other hand, when all zones have been processed (step S806: Yes), the correction process 3 ends.

Returning to FIG. 17, when the designation list is corrected by the correction process 3, the digital camera executes step S508 and S509 the same as steps S107 and S108 in FIG. 9, and creates and outputs a main video focused on the target object designated by the user in operation zones and on the target object (tracked object) recorded as the tracked object in other zones.

As explained above, with the digital camera 2 according to this preferred embodiment, it is possible to automatically track the target object (tracked object) that is the tracking target and create a video focused on the target object. Consequently, once the user chose an object that he or she wants to focus, video focused on the user's-chosen object is created.

Furthermore, when there is an object that should be more focus than the tracked object during a partial period of the video, or when the tracking results differ from what was intended, it is possible to designate a target position during that period and then focus on that position.

In addition, the digital camera 2 according to this preferred embodiment acquires the coordinates of the target object in two ways—a method through a designation operation and a method through tracking with the tracker 240. Furthermore, the video is divided into zones (time zones) in which the designation method differs, and correction is executed independently on each zone. As a result, it is possible to prevent declines of correction precision caused by being affected by designation information having a different nature because of a different designation method. A method through a designation operation and a method through tracking with the tracker 240 are exemplified as a plurality of methods designating the target object. However, correction may be executed by diving into designated zones using any different method not being limited to the above two methods. For example, when a designation list is created and registered by designation operation and later a portion of the list is changed, one option may be such that one designation method is set to designation by the initial operation and a different designation method is set to designation by the subsequent operation to register (partially overwrite) distinguishably in the list. In this case, correction may be executed by diving into a time zone in which designated information by the initial operation exceeds the prescribed ratio and into another time zone of less than the prescribed ratio.

Fourth Preferred Embodiment

Next, the fourth preferred embodiment of the present invention will be explained. In the fourth preferred embodiment, the contents of the correction program executed by the corrector 3430 differ from the third preferred embodiment. The composition other than that is the same as the third preferred embodiment.

The digital camera 2 and video creation device 30 of this preferred embodiment have the same composition as the similarly named equipment in the third preferred embodiment.

Figure 21:
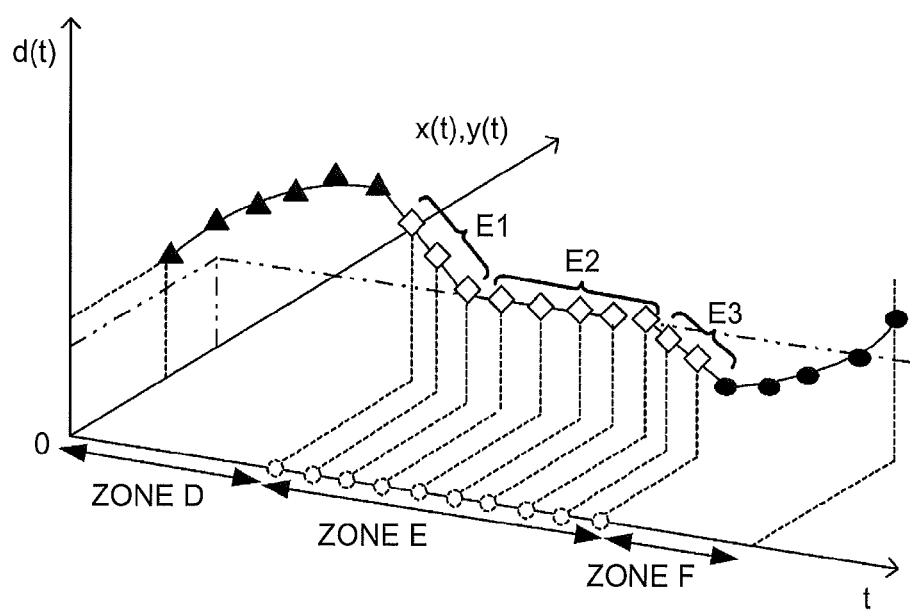
FIG. 21 is a drawing showing an example of the correction process according to a fourth preferred embodiment of the present invention.

In this preferred embodiment, when designation information is not obtained for a time longer than a prescribed time, the corrector 3430 corrects the designation information based on default values for coordinate correction stored in the settings memory 410. Here, as shown in FIG. 21, this is explained taking as an example a case in which in zone D that is designation information from tracking by the tracker 240 is obtained and in zone F that is designation information through a designation operation is obtained, while in zone E (a null zone), designation information is not obtained.

In this case, correction is made the same as in the third preferred embodiment for the zone D and the zone F. On the other hand, in the front half of the zone E (E1 in FIG. 21), the null value is replaced so as to gradually approach the default value (two-dot chain line) for coordinate correction from the designation information immediately prior. In addition, in the latter half of the zone E (E3 in FIG. 21), the null value is replaced to gradually approach the default value (two-dot chain line) for coordinate correction from the designation information immediately following. In the center of the zone E3 (E2 in FIG. 21), the null value is replaced by the default value. At this time, for E1 and E2 it would be fine to do linear interpolation between the value immediately prior (or immediately following) and the default value. The slope when doing linear interpolation is taken to be a predetermined prescribed value. Or, the time length of E1 and E3 (the number of frames included in E1 and E3) is taken as a constant and the slope is determined to reach the default value in that length. This is because E1 and E3 are zones shifting to the default value from values before and after the null zone, it is possible to call them as transition zones.

Figure 17:
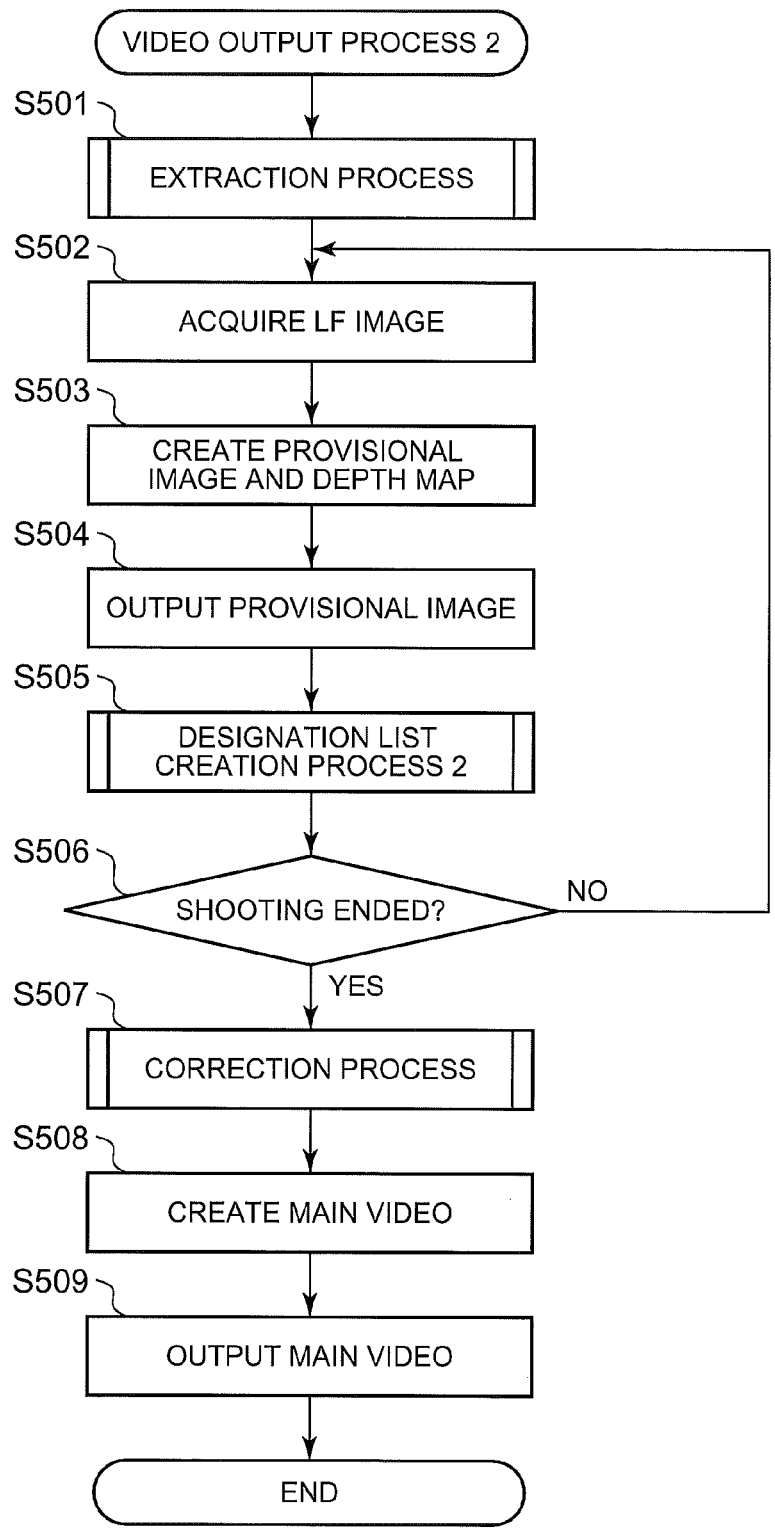
FIG. 17 is a flowchart showing the video output process according to the third preferred embodiment.
Figure 22:
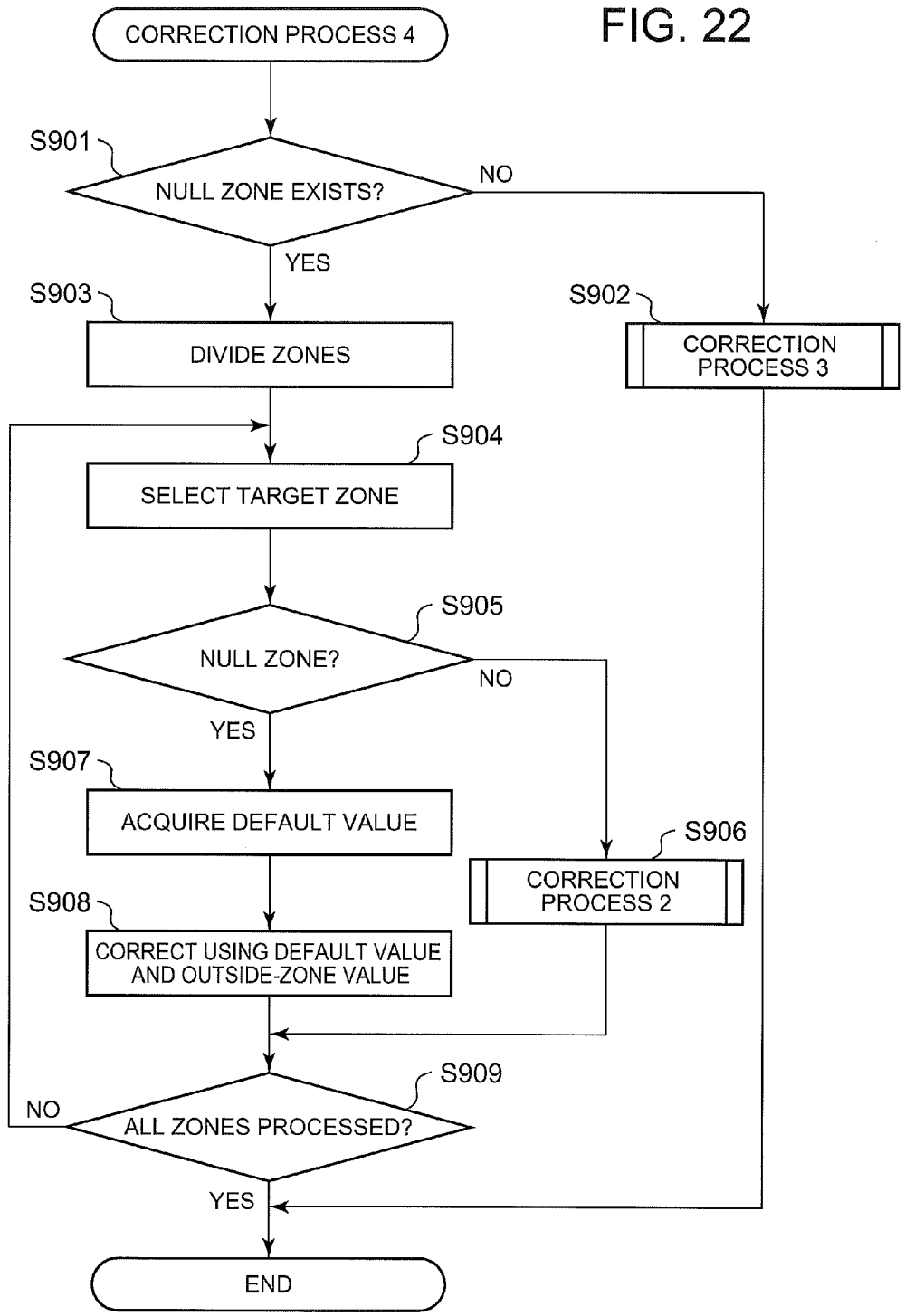
FIG. 22 is a flowchart showing the correction process according to the fourth preferred embodiment.

The digital camera 2 and the video creation device 30 execute the video output process 2 of FIG. 17 the same as in the third preferred embodiment with the exception that the correction process executed in step S507 is correction process 4 shown in FIG. 22.

The correction process 4 executed in step 507 will be explained with reference to FIG. 22.

In this correction process 4, first the corrector 3430 determines whether or not there is a null zone (for example, the part corresponding to zone E in FIG. 21) in the designation list (step S901). Specifically, the corrector 3430 determines whether or not there is a part where a row of null values continues in excess of a predetermined value (for example a number of rows corresponding to 0.5 second in the video), and when such exists, this is determined to be a null zone, while when such does not exist, this is determined that there is no null zone. Or, it would be fine to determine, when a row of null values is larger than a prescribed ratio and is a longer zone than a prescribed threshold value, these are null zone.

When it is determined that there is no null zone (step S901: No), the correction process 3 (FIG. 20) is executed the same as in the third preferred embodiment, curve estimation is executed and the designation list is corrected based on the estimation results.

On the other hand, when it is determined that there is a null zone (step S901: Yes), the corrector 3430 divides the designation list into zones (step S903). Specifically, the designation list is divided into a null zone, an operation zone and a zone based on tracking results (for example, parts corresponding to zone A and zone C in FIG. 15).

Next, the corrector 3430 selects one of the divided zones as the target zone (step S904). Then, a determination is made as to whether or not the target zone is a null zone (step S905), and when it is determined that the target zone is not a null zone (step S905: No), the corrector 3430 executes correction through curve similarity by means of correction process 2 (FIG. 13) for the target zone.

On the other hand, when it is determined that the target zone is a null zone (step S905: Yes), the corrector 3430 acquires the default value stored in the settings memory 410 (step S907).

Then, the row of null values of the designation list is corrected based on the default value and the values (adjacent values) of designation information adjacent before and after the target zone (step S908). Specifically, the length of transition zone is set based on the difference between the default value and the before and after adjacent values. The transition zones become longer the larger the difference between the corresponding adjacent values and the default value. Here, a value obtained by dividing the difference between the corresponding adjacent values and the default value by a predetermined constant, making this an integer and then taking the absolute value, which is the length of the transition zone. Then, null values in the transition zone are replaced by values obtained through linear interpolation with the adjacent values and the default value. Between the transition zones (E2 in FIG. 21, for example), the null value is replaced by the default value.

When step S906 or step S908 ends, the corrector 3430 determines whether or not the above-described process has been executed for all divided zones in step S903 (step S909). When there is an unprocessed zone (step S909: No), the next unprocessed zone is set as the target zone and the process is repeated from step S904. On the other hand, when all zones have been processed (step S909: Yes), the correction process 4 ends.

As explained above, when information for designating the focal length of the video cannot be obtained in a given time zone, the digital camera 2 of this preferred embodiment makes settings so that the focal length approaches a default value from the zones before and after. Consequently, it is possible to create a video with no discomfort even if designation of the focal length is not obtained for a long time.

(Variations)

The first through fourth preferred embodiments of the present invention have been explained, but the preferred embodiments of the present invention are intended to be illustrative and not limiting, and various variations are possible.

For example, in the first through fourth preferred embodiments, the provisional video is made up of frames of reconstructed images that are reconstructed from LFI using a default value, but it is fine for the frames of the provisional video to be created by an arbitrary method in which the user can select the target object or the tracker creates images from which the target object can be extracted.

Specifically, frames (provisional images) of the provisional video may be simple images created by extracting a prescribed area in the center of each sub-image, reversing by point symmetry and arranging at positions corresponding to each sub-lens.

In addition, in the first through fourth preferred embodiments, the designation information is set by creating and outputting provisional images for each frame of the video. However, the method of setting the designation information for each frame is not limited to this, it would be fine to output the provisional video and receive a designation operation (or execute a tracking process) after creating then entire provisional video at once (using a default value, and/or the like).

In addition, in the first through fourth preferred embodiments, the main video was output after creating one designation list for the provisional video, but this is not limited, it would be fine to create multiple designation lists for the provisional video. That is to say, a designation operation using the provisional video would be accomplished multiple times, a designation list would be created for each and a correction process executed, and the results stored in a memory. Then, when the user selects a desired designation list from among the multiple designation lists, the main video would be created and output based on the designated list.

With this kind of composition, it is possible to set multiple differing focal lengths for a single source (shooting video) and differentiate usage in accordance with objective. For example, by preserving designation lists for creating different videos with the focus on various target people (various children, for example) from video shot to multiple people (for example, multiple children running at an athletic meet), it is possible to output video focused on a desired person when necessary.

In addition, in the first through fourth preferred embodiments, the correction target was taken to be the coordinate (d(t), x(t), y(t)) vector of the focal position included in the designation information, but the designation information that is the correction target is not limited to this.

For example, it would be fine to obtain d(t) from the coordinates (x(t), y(t)) acquired by the designation acquirer 320, to store only d(t) as the coordinates of the focal position in the designation list, and executes the correction process only to d(t). At this time, the coordinates of the focal position are the coordinates in a one-dimensional coordinate system having d(t) as a component. With this kind of composition, it is possible to reduce the process quantity.

Or, it would be fine for the coordinates of the focal position to be an arbitrary vector having as a component the direction of the normal line to the frame (for example, the optical axis OA) for reconstructing the main video.

In addition, the correction process was explained, which corrects the coordinates (x(t), y(t), d(t)) of the focal position one time as an example, but the correction method is not limited to this. For example, it would be fine to correct a designation list including the coordinates (x(t), y(t), d(t)) of the focal position and then acquire d''(t) based on the post-correction x'(t) and y'(t), and average the acquired d''(t) and the corrected d'(t) to obtain the final post-correction d(t). With this kind of composition, when the coordinates acquired by the designation acquirer 320 are deviated, it is possible to make corrections reflecting the depth coefficient of positions where deviations were corrected, so the accuracy of corrections improves.

In addition, with the above-described preferred embodiments, the explanation assumed that the frame rates of the LFI video, the provisional video and the main video are the same and there is a one-to-one correspondence between frames in each video. However, this is not limited, for it would be fine to have a different number of frames in each video as long as the original LFIs and designation information are determined for each frame of the main video.

For example, suppose that the LFI is acquired at 24 fps (frames per second) and the provisional video and main video have a faster frame rate (for example, 60 fps), it would be fine to create and output multiple provisional videos from the same LFI and obtain designation information designating the focal length for each frame of the main video. In this case, multiple frames of the main video are created using multiple pieces of differing designation information from the same LFI.

In addition, it is also possible to set the frame rate of the LFI video and the provisional video lower than the main video, to set designation information for frames in the main video for which there is no corresponding provisional video, and to interpolate null values through correction.

In addition, in the above-described preferred embodiments, it is fine for the pixel count (resolution) of the provisional video and the pixel count (resolution) of the main video to be different. In this case, it is fine for the composition of the pixels of the provisional video created from the LFI images to be determined in accordance with the displayable pixel count of the display. In addition, it is fine for the composition of the pixels of the main video to be determined in accordance with the pixel count of video that is recorded, and in this case, the coordinates of the target object are changed in accordance with the composition of pixels in the provisional video and main video.

Besides this, the above-described hardware composition and flowcharts are one example, and arbitrary alterations and modifications are possible.

The components essential to accomplish processes of video output are the information processor 31, the main memory 32, the external memory 33 and/or the like, these components are not need to be specialized system but these components can be realized using a regular computer system. For example, it would be fine to have a composition such that a computer program for executing the above-described actions is stored on and distributed via a computer-readable recording medium (flexible disk, CD-ROM, DVD-ROM, and/or the like), and the above-described computer program is installed on a computer and accomplishes a process for creating reconstructed images. In addition, it would be fine that above-described computer program can be stored in a memory device of a server on a communication network such as the internet, and then regular computer system can download above-described computer program from the server, so that it can be video creation device.

When the functions of the video creation device are divided between an OS (operating system) and application programs, or are realized through cooperation between an OS and application programs, it would be fine for the application program portion alone to be stored on a recording medium or memory device.

In addition, it is possible for such a computer program to be overlaid on carrier waves and distributed via a communication network. For example, it would be fine to post the above-described computer program on a BBS (Bulletin Board System) on a communication network and to distribute the above-described computer program via the network. Furthermore, it would be fine to have a composition such that the above-described processes are executed by activating this computer program and executing programs under control of the OS.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the object matter disclosed herein.

What is claimed is:

1. An image processing device comprising:
    a provisional acquirer that acquires, for each frame of a video, a provisional image for designating a position in the frame of an object on which to focus and for acquiring a depth map showing a depth of the object, each provisional image being reconstructed using a default value for provisional image creation from a multi-aspect image in which the object is shot from each of multiple viewpoints, and the multi-aspect image being a light field image that comprises multiple sub-images;
    a coordinate acquirer that acquires a coordinate of a focal position of the object on a provisional image plane, for each provisional image acquired by the provisional acquirer;
    a first setter that sets, for a frame of the video, a coordinate of the focal position acquired by the coordinate acquirer in a coordinate system including a component of a normal line axis of the frame;
    a second setter that resets the coordinate of the focal position for the frame of the video, based on coordinates of the focal position set by the first setter for other frames of the video; and
    an image acquirer that acquires, for each frame of the video, an image that is (i) reconstructed from the multi-aspect image in which the object is shot from each of the multiple viewpoints, and (ii) focused at a focal length determined from the coordinate of the focal position set by at least one of the first and the second setters.

2. The image processing device according to claim 1, wherein the second setter comprises a corrector that corrects the coordinate of the focal position for the frame of the video, based on coordinates of the focal position set by the first setter for other frames of the video, and
    wherein the corrector obtains an approximate curve of the coordinates of the focal position set by the first setter, and adapts at least a portion of those coordinates of the focal position to the approximate curve.

3. The image processing device according to claim 1, wherein the second setter comprises a corrector that corrects the coordinate of the focal position for the frame of the video, based on coordinates of the focal position set by the first setter for other frames of the video, and
    wherein the corrector attenuates a high-frequency component on a time axis of the coordinates of the focal position set by the first setter.

4. The image processing device according to claim 1, wherein the second setter (i) extracts a zone that includes more than a prescribed ratio of frames in which the coordinate acquirer could not acquire the coordinates of the focal position, and the zone that is longer than a prescribed time or has a frame number larger than a prescribed number, and (ii) sets the coordinates of the focal position of frames belonging to the extracted zone based on a default value of coordinate correction and coordinates of the focal position acquired by the coordinate acquirer from frames adjacent to the zone.

5. The image processing device according to claim 1, wherein the second setter (i) extracts a zone of frames in which the coordinate acquirer could not acquire the coordinates of the focal position, and (ii) interpolates the coordinates of the focal position of frames belonging to the extracted zone based on coordinates of the focal position acquired by the coordinate acquirer from frames adjacent to the zone.

6. The image processing device according to claim 1, wherein:
    the coordinate acquirer acquires, for each frame of the video, the coordinate of the focal position on the provisional image plane, the coordinates being accepted by a prescribed method from among multiple methods; and
    the second setter (i) divides the video into (a) time zone in which there is more than a prescribed ratio of frames in which the first setter has set coordinates of the focal position using the coordinates of the focal position accepted by the prescribed method, and (b) time zone with less than the prescribed ratio of frames, and (ii) executes setting on each divided time zone.

7. The image processing device according to claim 6, further comprising:
    an output device;
    wherein:
    the output device successively outputs the provisional images to an image display device; and
    one of the multiple methods is accepting information about an operation of designating the coordinate of the focal position on the provisional image for each frame.

8. The image processing device according to claim 6, further comprising an extractor that extracts a coordinate of the focal position of a target object based on features of the provisional image,
wherein one of the multiple methods is accepting the coordinate of the focal position extracted by the extractor for each frame.

9. An imaging device, comprising:
an imager;
a provisional acquirer that acquires, for each frame of a video, a provisional image for designating a position in the frame of an object on which to focus and for acquiring a depth map showing a depth of the object, each provisional image being reconstructed using a default value for provisional image creation from a multi-aspect image in which the object is shot from each of multiple viewpoints, and the multi-aspect image being a light field image that comprises multiple sub-images;
a coordinate acquirer that acquires a coordinate of the focal position of the object on a provisional image plane, for each provisional image acquired by the provisional acquirer;
a first setter that sets, for a frame of the video, a coordinate of the focal position acquired by the coordinate acquirer in a coordinate system including a component of a normal line axis of the frame;
a second setter that resets the coordinate of the focal position for the frame of the video, based on coordinates of the focal position set by the first setter for other frames of the video; and
a reconstructor that reconstructs, for each frame of the video, an image that is focused at a focal length determined from the coordinate of the focal position set by at least one of the first and second setters, from the multi-aspect image in which the object is shot from each of the multiple viewpoints.

10. An image processing method comprising:
provisionally acquiring, for each frame of a video, a provisional image for designating a position in the frame of an object on which to focus and for acquiring a depth map showing a depth of the object, each provisional image being reconstructed using a default value for provisional image creation from a multi-aspect image in which the object is shot from each of multiple viewpoints, and the multi-aspect image being a light field image that comprises multiple sub-images;
acquiring a coordinate of a focal position of the object on a provisional image plane, for the each provisional image acquired;
setting, for a first frame of a video, a coordinate of the focal position acquired in a coordinate system including a component of a normal line axis of the frame;
resetting the coordinate of the focal position for the first frame of the video based on coordinates of the focal position set for frames of the video other than the first frame; and
acquiring, for each frame of the video, an image that is (i) reconstructed from the multi-aspect image in which the object is shot from each of the multiple viewpoints, and (ii) focused at a focal length determined from the coordinate of the focal position set by at least one of the setting and the resetting.

11. A non-transitory computer-readable recording medium having stored thereon a program executable by a computer, the program controlling the computer to perform functions comprising:
a provisional acquisition function that acquires, for each frame of a video, a provisional image for designating a position in the frame of an object on which to focus and for acquiring a depth map showing a depth of the object, each provisional image being reconstructed using a default value for provisional image creation from a multi-aspect image in which the object is shot from each of multiple viewpoints, and the multi-aspect image being a light field image that comprises multiple sub-images;
a coordinate acquisition function that acquires a coordinate of a focal position of the object on a provisional image plane, for the each provisional image acquired by the provisional acquisition function;
a first setting function that sets, for a frame of the video, a coordinate of the focal position acquired by the coordinate acquisition function in a coordinate system including a component of a normal line axis of the frame;
a second setting function that resets the coordinate of the focal position for the frame of the video based on coordinates of the focal position set by the first setting function for other frames of the video; and
an image acquisition function that acquires, for each frame of the video, an image that is (i) reconstructed from the multi-aspect image in which the object is shot from each of the multiple viewpoints, and (ii) focused at a focal length determined from the coordinate of the focal position set by at least one of the first and the second setting functions.

12. The image processing device according to claim 1, further comprising:
a creator that creates a video the frames of which are images acquired by the image acquirer; and
an output device that outputs the video created by the creator.

13. The imaging device according to claim 9, further comprising:
a creator that creates a video the frames of which are images reconstructed by the reconstructor; and
an output device that outputs the video created by the creator.

14. The method according to claim 10, further comprising:
creating a video the frames of which are the acquired images; and
outputting the created video.

15. The non-transitory computer-readable recording medium according to claim 11, the program controlling the computer to perform further functions comprising:
a creation function that creates a video the frames of which are images acquired by the image acquisition function; and
an output function that outputs the video created by the creation function.

16. The image processing device according to claim 1, wherein the provisional acquirer executes frame interpolation of the provisional image when creating a provisional video.

17. The image processing device according to claim 1, wherein the provisional acquirer executes a prescribed blur adding process of the provisional image when creating a provisional video.

18. The image processing device according to claim 1, wherein the coordinate acquirer acquires a coordinate of a touch position touched by a user on an image plane of the provisional image as the coordinate of the focal position of the object on the provisional image plane, for each provisional image acquired by the provisional acquirer.

19. The image processing device according to claim 12, wherein the video created by the creator has a same frame rate and a same frame number as a frame rate and a frame number of a provisional video created by the provisional acquirer.

20. The image processing device according to claim 1, wherein the first setter obtains a component of the normal line axis of the coordinate of the focal position set based on an object distance estimated from an extent to which a position of a pixel corresponding to a target object deviates on the multiple sub-images, the target object being the object positioned at the coordinate of the focal position acquired by the coordinate acquirer.

21. The image device according to claim 9, wherein the first setter obtains a component of the normal line axis of the coordinate of the focal position set based on an object distance estimated from an extent to which a position of a pixel corresponding to a target object deviates on the multiple sub-images, the target object being the object positioned at the coordinate of the focal position acquired by the coordinate acquirer.

22. The method according to claim 10, wherein a component of the normal line axis of the coordinate of the focal position is obtained in the setting the coordinate of the focal position for the first frame, the component being set based on an object distance estimated from an extent to which a position of pixel corresponding to a target object deviated on the multiple sub-images, and the target object being the object positioned at the coordinate of the focal position acquired.

23. The non-transitory computer-readable recording medium according to claim 11, wherein the first setting function obtains a component of the normal line axis of the coordinate of the focal position set based on an object distance estimated from an extent to which the position of the pixel corresponding to a target object deviates on the multiple sub-images, the target object being an object positioned at the coordinate of the focal position acquired by the coordinate acquisition function.

* * * * *